US010085358B2

(12) United States Patent
Adiletta et al.

(10) Patent No.: US 10,085,358 B2
(45) Date of Patent: Sep. 25, 2018

(54) TECHNOLOGIES FOR SLED ARCHITECTURE

(71) Applicant: Intel Corporation, Santa Clara, CA (US)

(72) Inventors: Matthew J. Adiletta, Bolton, MA (US); Aaron Gorius, Upton, MA (US); Myles Wilde, Charlestown, MA (US); Michael T. Crocker, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/396,646

(22) Filed: Dec. 31, 2016

(65) Prior Publication Data

US 2018/0027687 A1    Jan. 25, 2018

Related U.S. Application Data

(60) Provisional application No. 62/365,969, filed on Jul. 22, 2016, provisional application No. 62/376,859, (Continued)

(51) Int. Cl.
*H05K 7/14* (2006.01)
*G06F 1/18* (2006.01)
(Continued)

(52) U.S. Cl.
CPC .......... *H05K 7/1489* (2013.01); *G06F 1/183* (2013.01); *H05K 1/181* (2013.01); *H05K 7/1492* (2013.01); *H05K 7/2039* (2013.01); *H05K 7/20709* (2013.01); *H05K 2201/10121* (2013.01); *H05K 2201/10159* (2013.01); *H05K 2201/10189* (2013.01)

(58) Field of Classification Search
CPC .............................. G06F 1/183; H05K 7/1488
See application file for complete search history.

(56) References Cited

U.S. PATENT DOCUMENTS

| 5,303,121 | A  | * | 4/1994  | Thornberg | ............. | H05K 1/141 |
|           |    |   |         |           |               | 174/255 |
| 6,325,636 | B1 | * | 12/2001 | Hipp      | ............ | G06F 1/183 |
|           |    |   |         |           |               | 361/788 |

(Continued)

FOREIGN PATENT DOCUMENTS

JP    2005-190297    7/2005

OTHER PUBLICATIONS

International search report for PCT application No. PCT/US2017/038551, dated Sep. 29, 2017 (3 pages).
(Continued)

*Primary Examiner* — Adrian S Wilson
(74) *Attorney, Agent, or Firm* — Barnes & Thornburg LLP

(57) ABSTRACT

A sled for operation in a corresponding rack of a data center includes a chassis-less circuit board substrate having one or more physical resources coupled to a top side of the chassis-less circuit board and one or more memory devices coupled to a bottom side of the chassis-less circuit board. The sled does not include a housing or chassis and is opened to the local environment. In the illustrative embodiments, the sled may be embodied as a compute sled, an accelerator sled, or a storage sled.

22 Claims, 22 Drawing Sheets

Related U.S. Application Data filed on Aug. 18, 2016, provisional application No. 62/427,268, filed on Nov. 29, 2016.

(51) Int. Cl.
*H05K 1/18* (2006.01)
*H05K 7/20* (2006.01)

(56) References Cited

U.S. PATENT DOCUMENTS

| | | |
|---|---|---|
| 2003/0223199 A1* | 12/2003 | Smith .................. G06F 1/181 361/727 |
| 2005/0207134 A1* | 9/2005 | Belady .................. H05K 1/14 361/796 |
| 2007/0094535 A1 | 4/2007 | Prasee |
| 2008/0180896 A1* | 7/2008 | McClure ............... G06F 1/184 361/727 |
| 2012/0243169 A1 | 9/2012 | Rinke |
| 2015/0324124 A1 | 11/2015 | Mehta et al. |
| 2016/0012006 A1 | 1/2016 | Motamedi et al. |

OTHER PUBLICATIONS

Written opinion for PCT application No. PCT/US2017/038551, dated Sep. 29, 2017 (13 pages).

* cited by examiner

TECHNOLOGIES FOR SLED ARCHITECTURE

CROSS-REFERENCE TO RELATED APPLICATIONS

The present application claims the benefit of U.S. Provisional Patent Application No. 62/365,969, filed Jul. 22, 2016, U.S. Provisional Patent Application No. 62/376,859, filed Aug. 18, 2016, and U.S. Provisional Patent Application No. 62/427,268, filed Nov. 29, 2016.

BACKGROUND

Typical enterprise-level data centers can include several to hundreds of racks or cabinets, with each rack/cabinet housing multiple servers. Each of the various servers of a data center may be communicatively connectable to each other via one or more local networking switches, routers, and/or other interconnecting devices, cables, and/or interfaces. The number of racks and servers of a particular data center, as well as the complexity of the design of the data center, may depend on the intended use of the data center, as well as the quality of service the data center is intended to provide.

Traditional servers of a data center are self-contained compute devices designed to be mounted into a corresponding rack of the data center. To do so, typical data center servers include a housing with corresponding mounting mechanisms, such as brackets, to facilitate the mounting of the server into the rack or cabinet. The electrical components of the server are located within the housing, and the housing provides an amount of protection to the electrical components from the local environment, as well as from stray electromagnetic interference. Additionally, typical servers often include their own peripheral components or systems, such as an internal power supply and internal cooling. As such, the housing of a typical server is sized for the inclusion of such components inside the housing itself.

In some data centers, each server may be embodied as a general purpose server capable of servicing different types of workloads. Of course, some servers may have different resources compared to other servers (e.g., more or fewer processor cores). In some cases, some of the servers may be special-purposed servers configured to handle specialized workloads.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
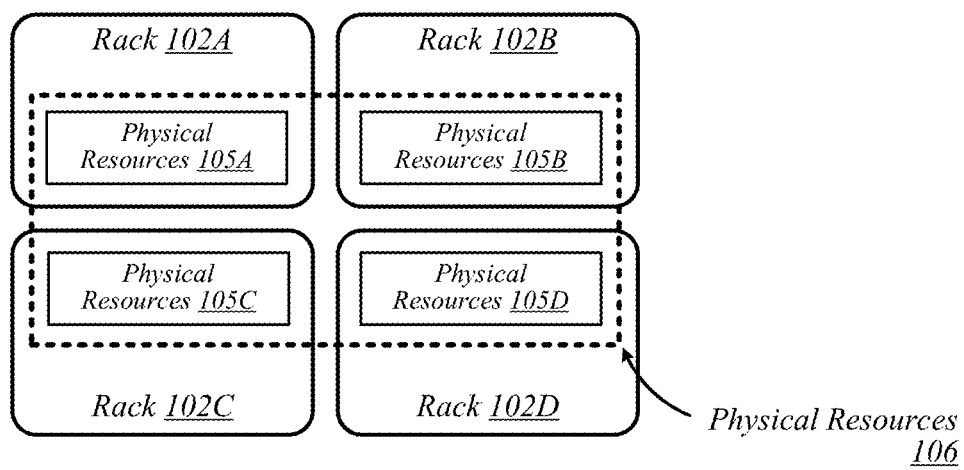
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual in-line memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
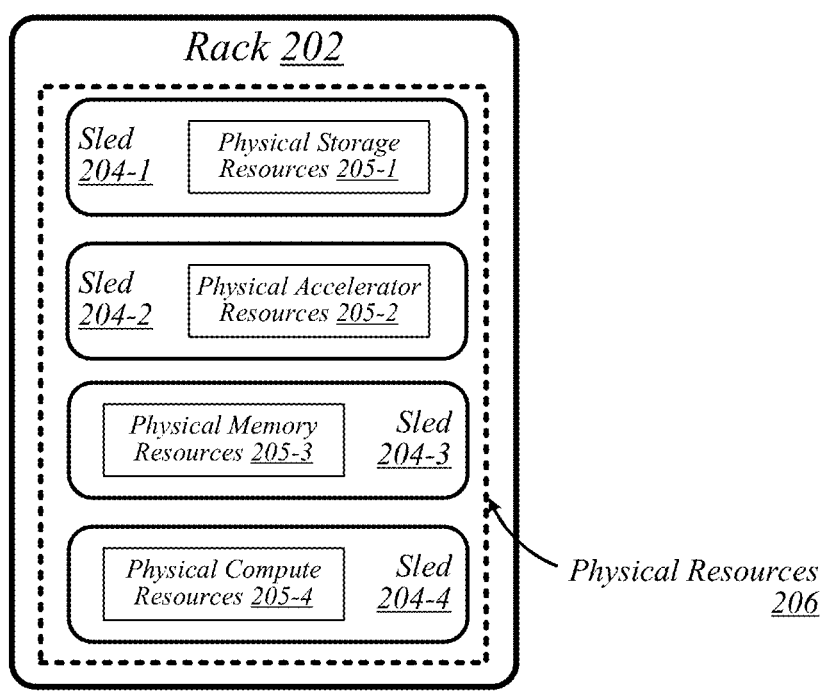
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulable sleds comprising disaggregated resources, each type of resource can be upgraded independently of each other and at their own optimized refresh rate.

Figure 3:
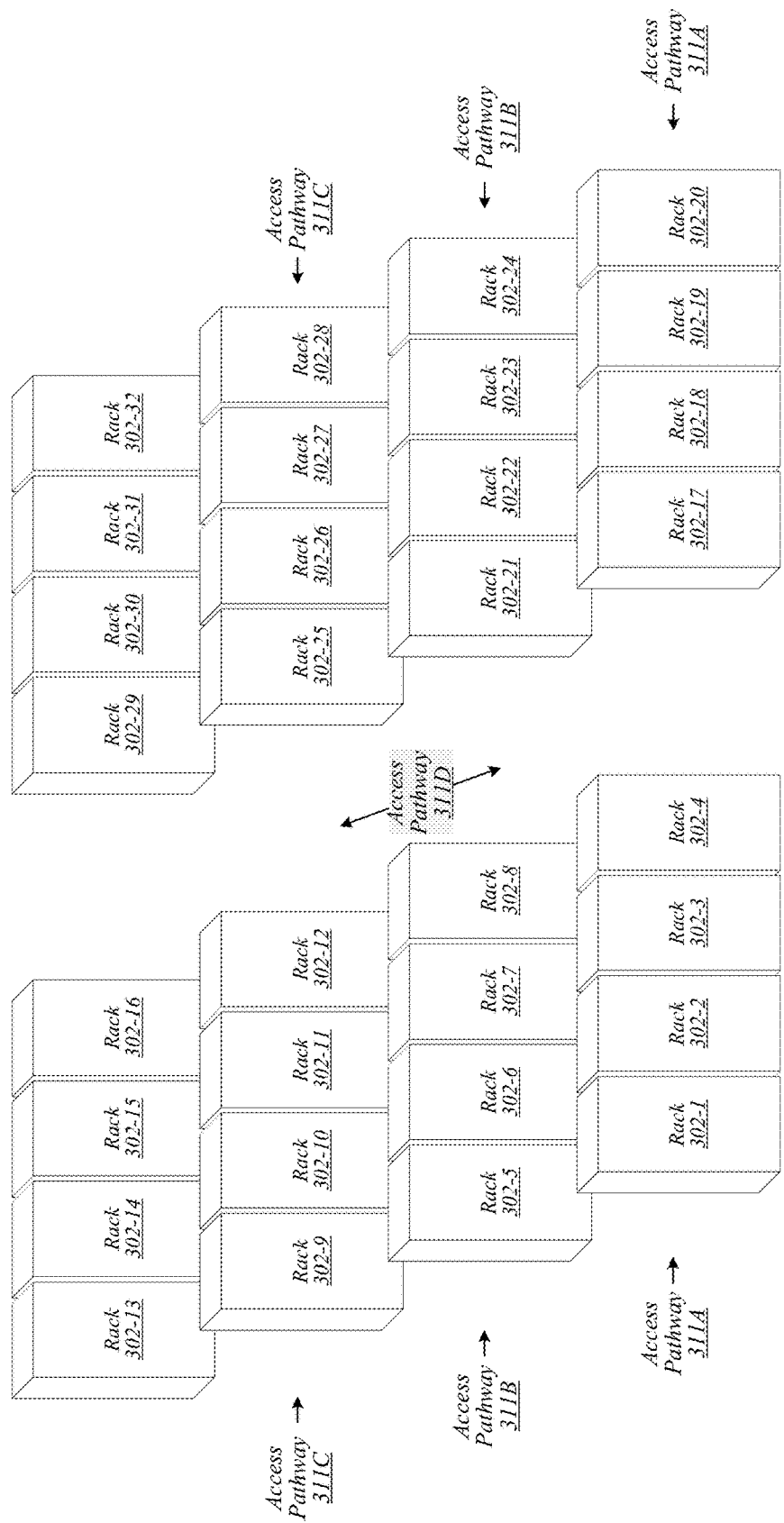
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
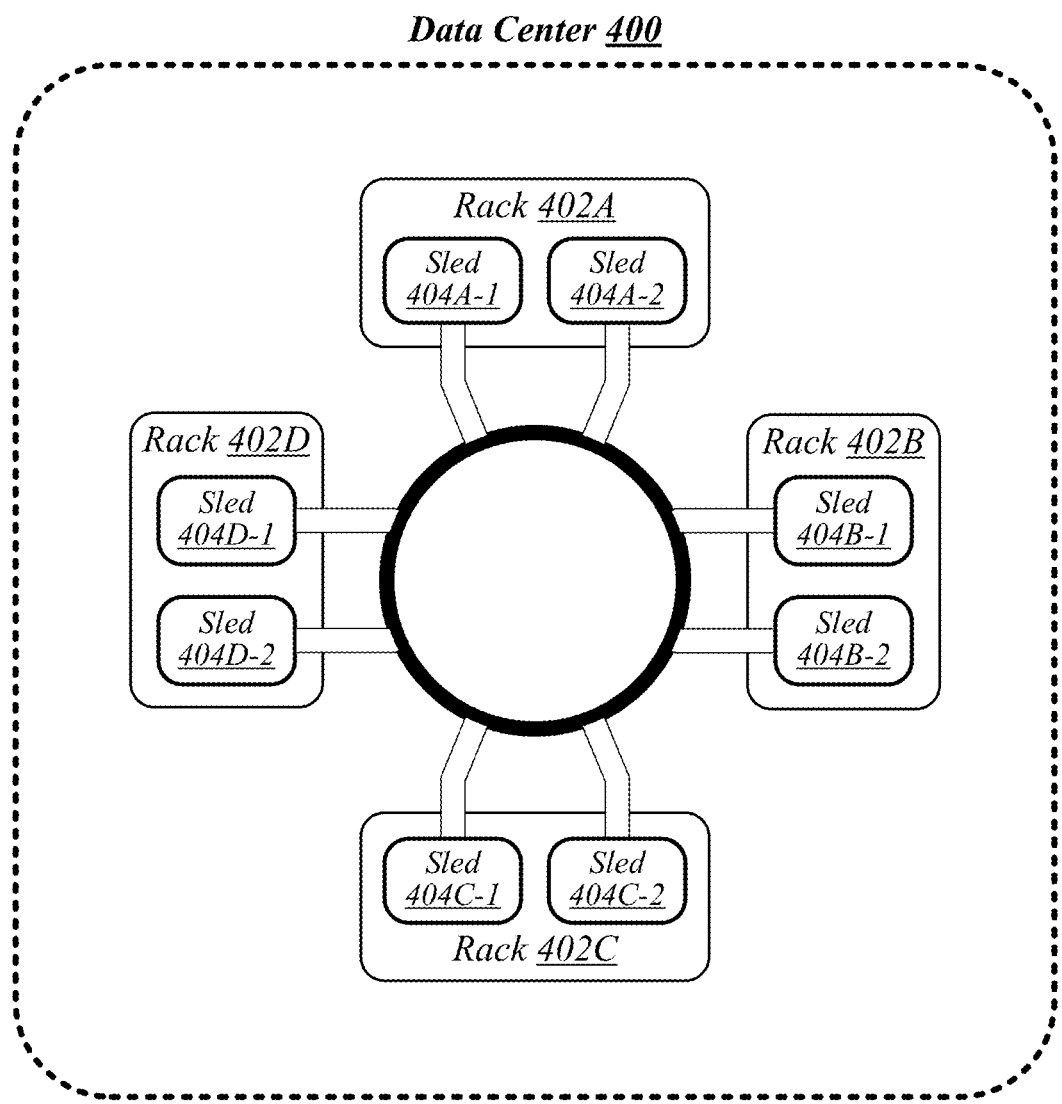
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
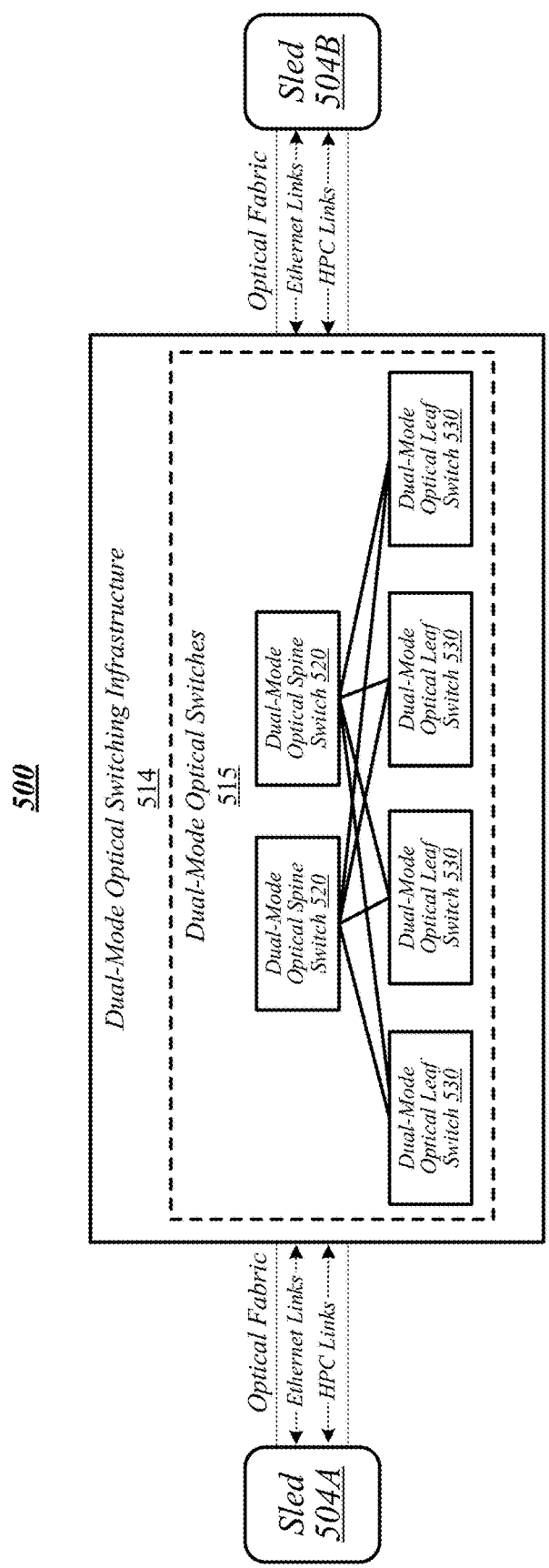
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
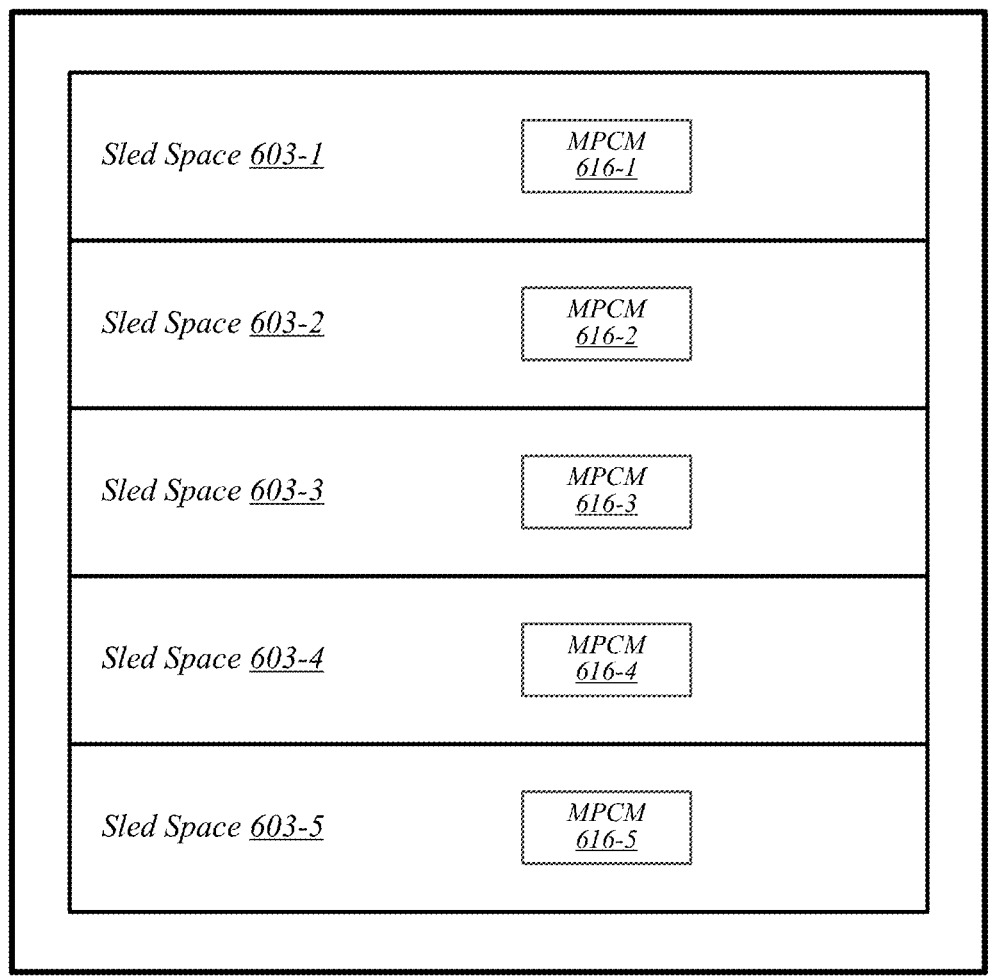
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
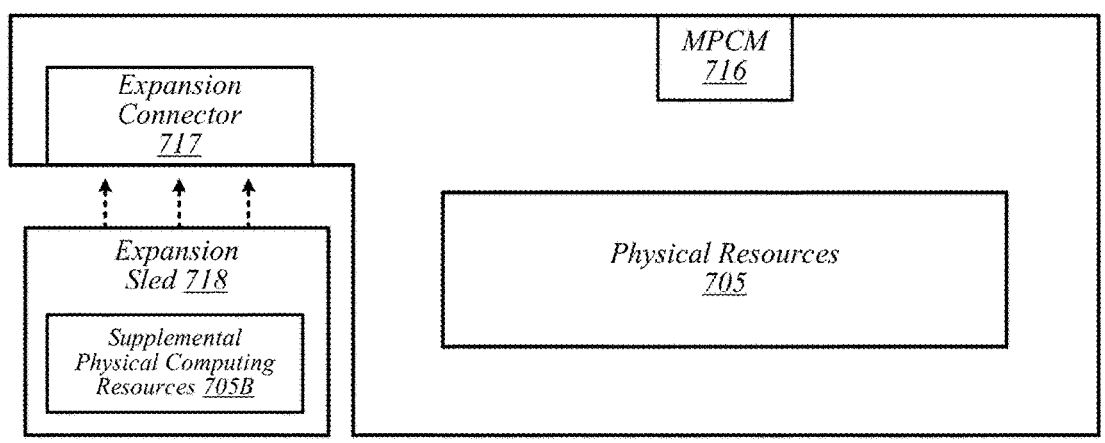
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
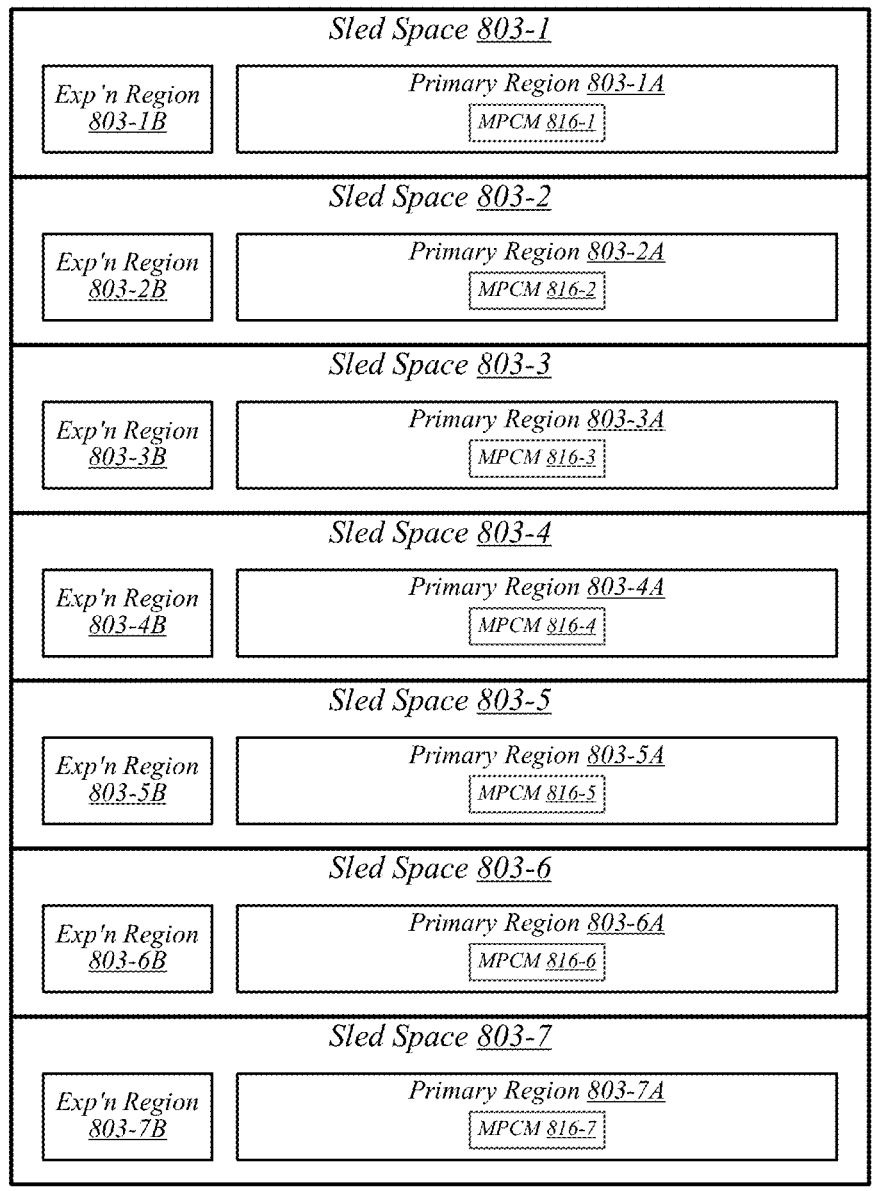
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
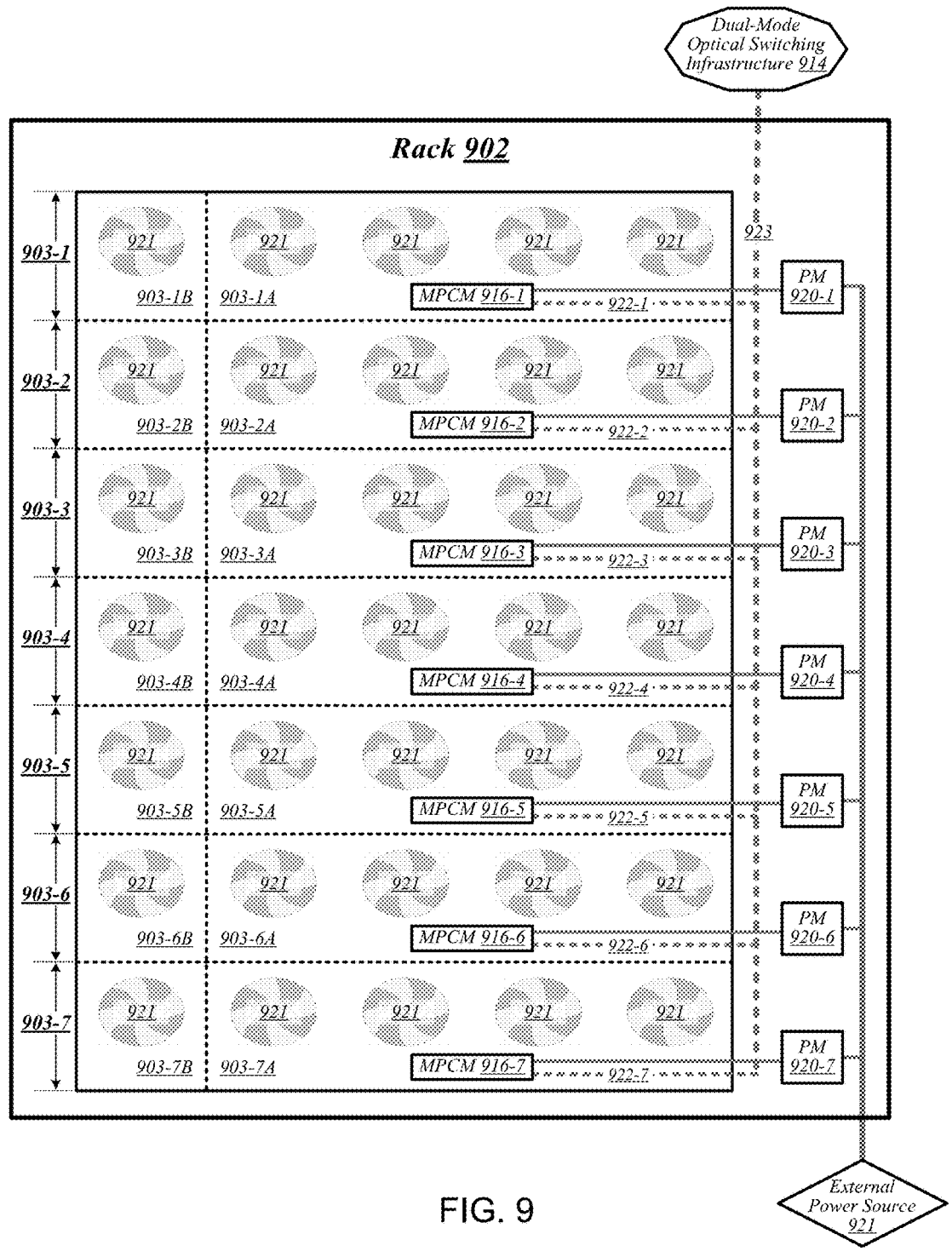
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heatsinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
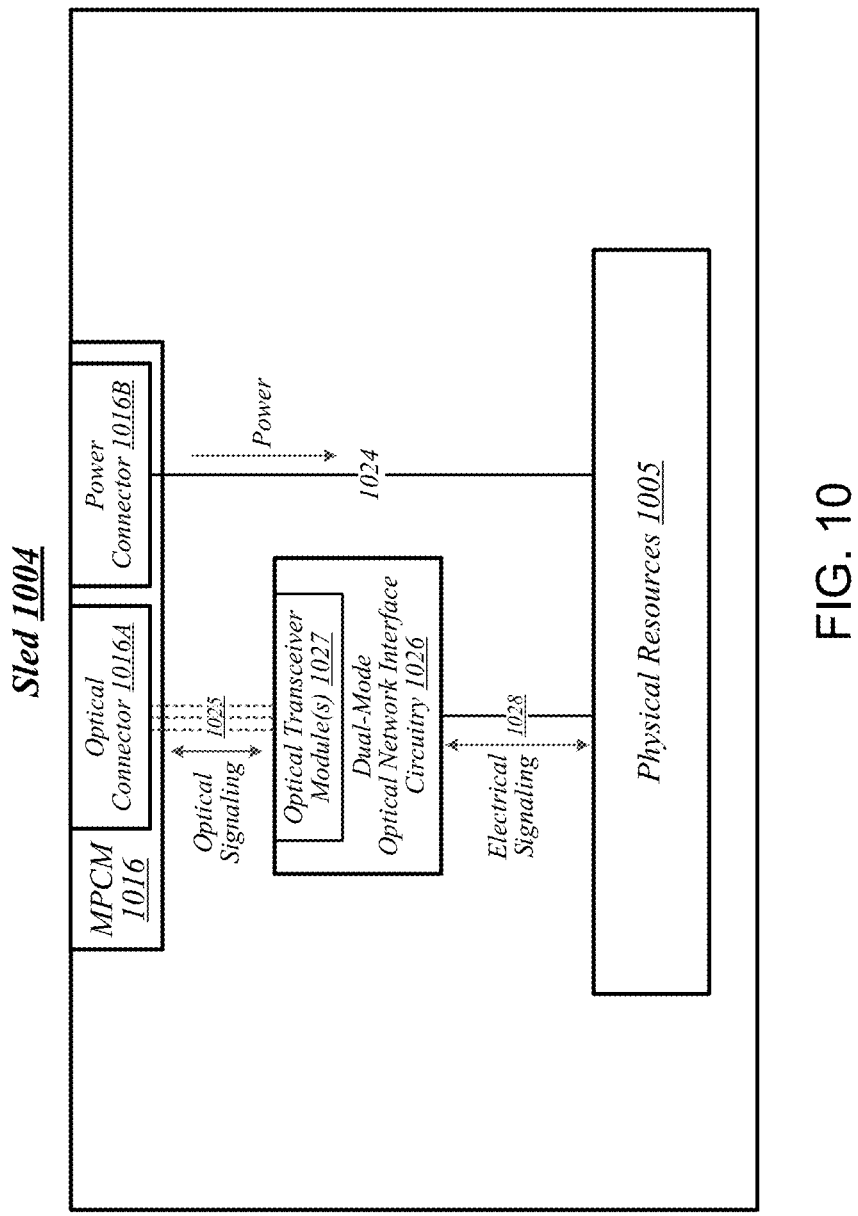
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heatsinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
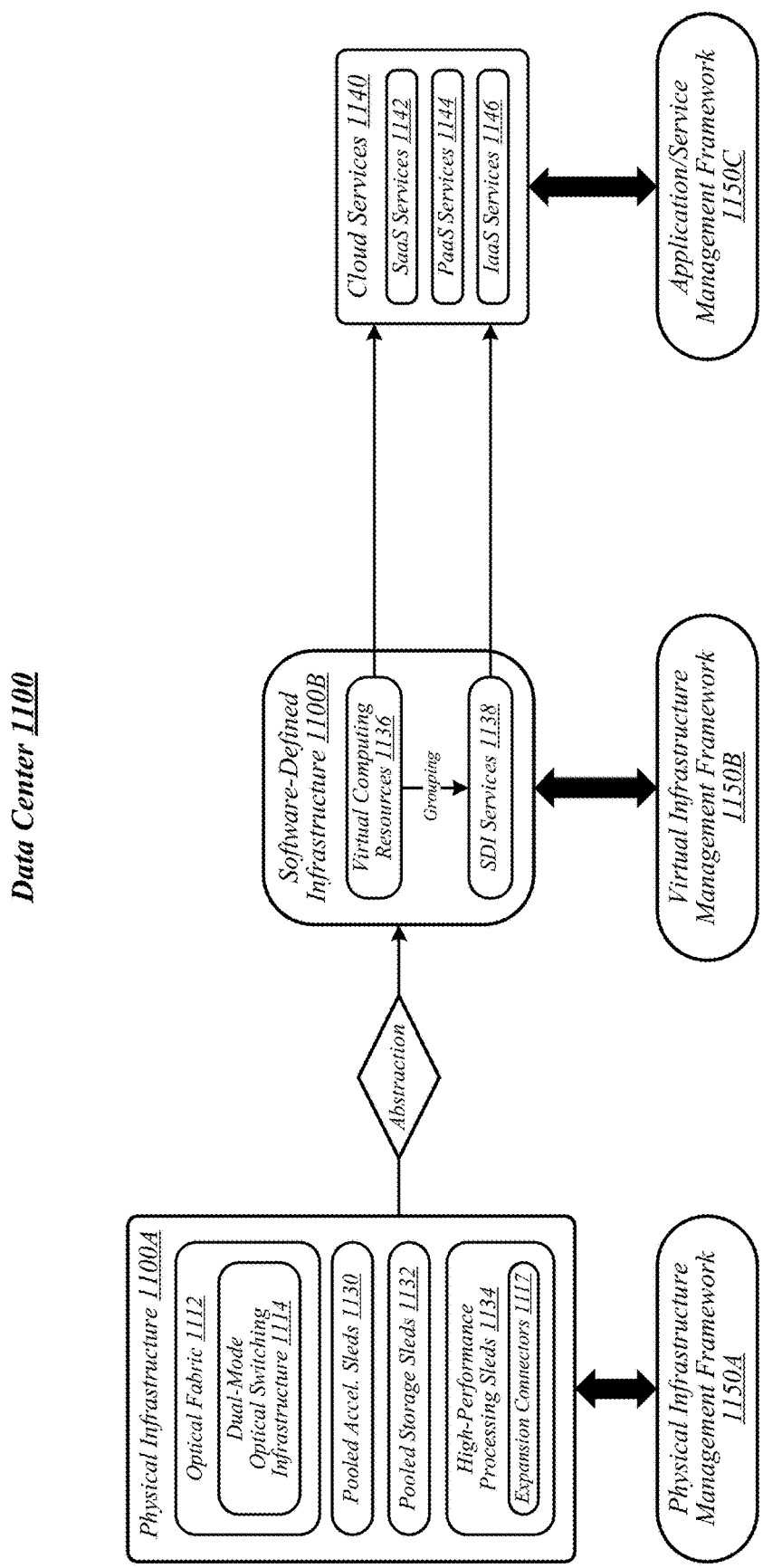
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
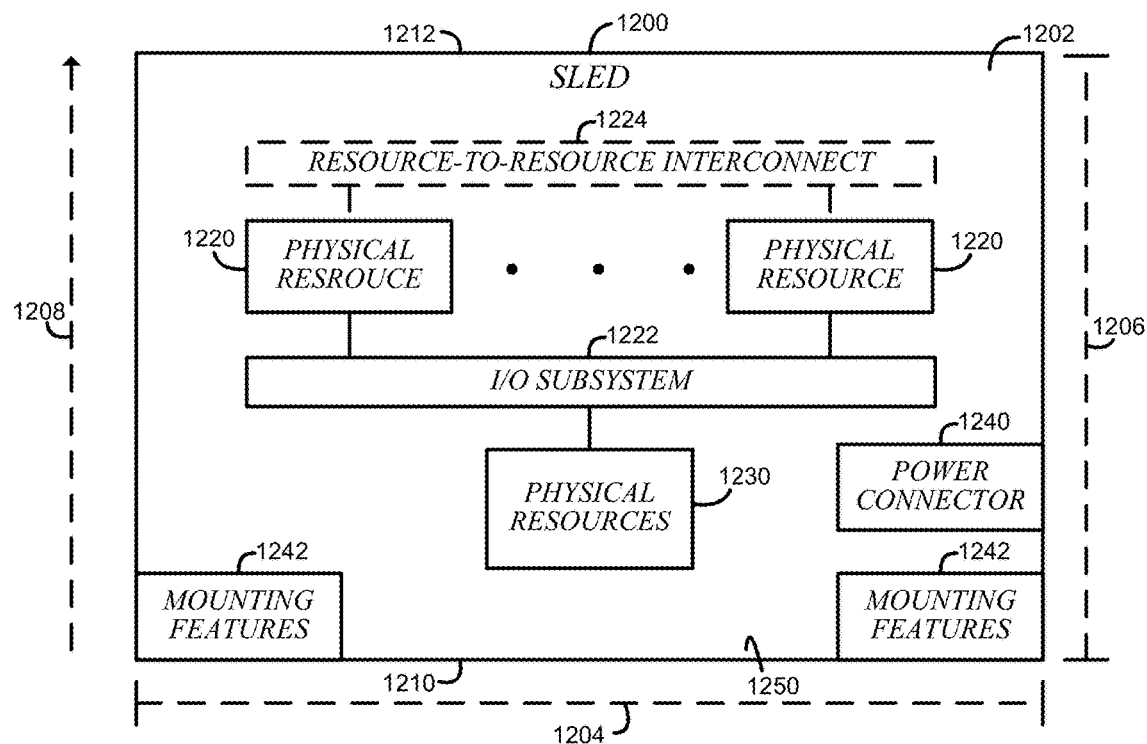
FIG. 12 is a simplified block diagram of at least one embodiment of a top side of a sled usable in the data center of FIGS. 1, 3, 4, and/or 11.
Figure 13:
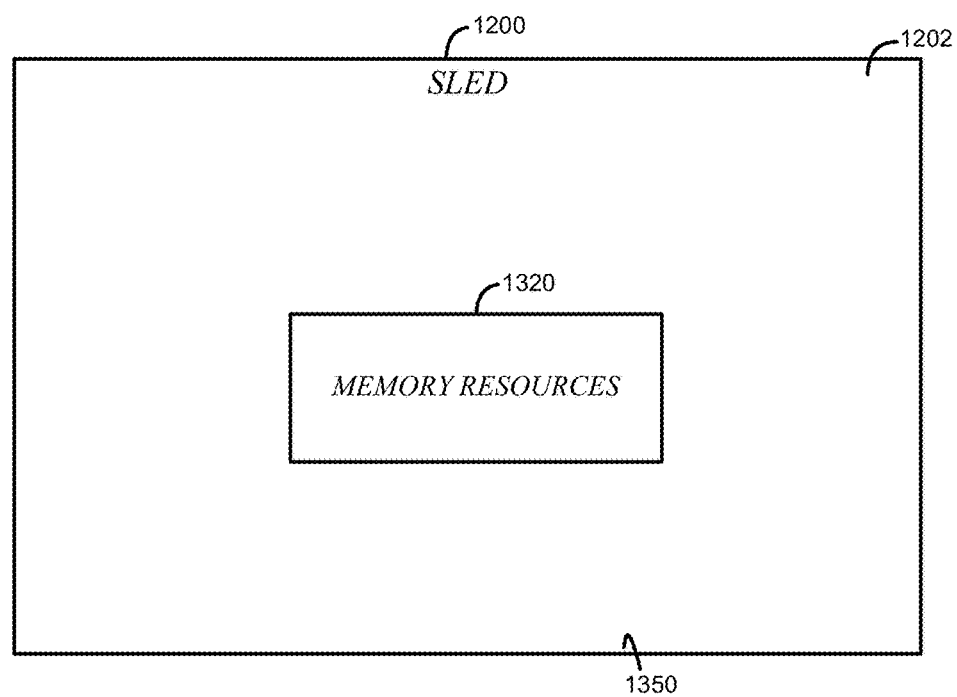
FIG. 13 is a simplified block diagram of at least one embodiment of a bottom side of the sled of FIG. 12.

Referring now to FIGS. 12 and 13, each of the sleds 204, 404, 504, 704, 1004 may be embodied as a sled 1200 in some embodiments. As discussed in more detail below, the sled 1200 is configured to be mounted in a corresponding rack 102, 202, 302, 402, 902 of the data center 100, 300, 400, 1100. In some embodiments, the sled 1200 may be optimized or otherwise configured for performing particular tasks, such as compute tasks, acceleration tasks, data storage tasks, etc. For example, the sled 1200 may be embodied as a compute sled 1400 as discussed in below in regard to FIGS. 14-19, an accelerator sled 2000 as discussed below in regard to FIGS. 20-24, a storage sled 2500 as discussed below in regard to FIGS. 25-29, or as a sled optimized or otherwise configured to perform other specialized tasks.

The illustrative sled 1200 includes a chassis-less circuit board substrate 1202, which supports various electrical components mounted thereon. It should be appreciated that the circuit board substrate 1202 is "chassis-less" in that the sled 1200 does not include a housing or enclosure. Rather, the chassis-less circuit board substrate 1202 is open to the local environment. The chassis-less circuit board substrate 1202 may be formed from any material capable of supporting the various electrical components mounted thereon. For example, in an illustrative embodiment, the chassis-less circuit board substrate 1202 is formed from an FR-4 glass-reinforced epoxy laminate material. Of course, other materials may be used to form the chassis-less circuit board substrate 1202 in other embodiments.

As discussed in more detail below, the chassis-less circuit board substrate 1202 includes multiple features that improve the thermal cooling characteristics of the various electrical components mounted on the chassis-less circuit board substrate 1202. As discussed, the chassis-less circuit board substrate 1202 does not include a housing or enclosure, which may improve the airflow over the electrical components of the sled 1200 by reducing those structures that may inhibit air flow. For example, because the chassis-less circuit board substrate 1202 is not positioned in an individual housing or enclosure, there is no backplane (e.g., a backplate of the chassis) to the chassis-less circuit board substrate 1202, which could inhibit air flow across the electrical components. Additionally, the chassis-less circuit board substrate 1202 has a geometric shape configured to reduce the length of the airflow path across the electrical components mounted to the chassis-less circuit board substrate 1202. For example, the illustrative chassis-less circuit board substrate 1202 has a width 1204 that is greater than a depth 1206 of the chassis-less circuit board substrate 1202. In one particular embodiment, for example, the chassis-less circuit board substrate 1202 has a width of about 21 inches and a depth of about 9 inches, compared to a typical server that has a width of about 17 inches and a depth of about 39 inches. As such, an airflow path 1208 that extends from a front edge 1210 of the chassis-less circuit board substrate 1202 toward a rear edge 1212 has a shorter distance relative to typical servers, which may improve the thermal cooling characteristics of the sled 1200. Furthermore, although not illustrated in FIG. 12, the various electrical components mounted to the chassis-less circuit board substrate 1202 are mounted in corresponding locations such that no two substantively heat-producing electrical components shadow each other as discussed in more detail below. That is, no two electrical components, which produce appreciable heat during operation (i.e., greater than nominal heat), are mounted to the chassis-less circuit board substrate 1202 linearly in-line with each other along the direction of the airflow path 1208 (i.e., along a direction extending from the front edge 1210 toward the rear edge 1212 of the chassis-less circuit board substrate 1202).

The illustrative sled 1200 includes one or more physical resources 1220 mounted to a top side 1250 of the chassis-less circuit board substrate 1202. Although two physical resources 1220 are shown in FIG. 12, it should be appreciated that the sled 1200 may include one, two, or more physical resources 1220 in other embodiments. The physical resources 1220 may be embodied as any type of processor, controller, or other compute circuit capable of performing various tasks such as compute functions and/or controlling the functions of the sled 1200 depending on, for example, the type or intended functionality of the sled 1200. For example, as discussed in more detail below, the physical resources 1220 may be embodied as high-power processors in embodiments in which the sled 1200 is embodied as a compute sled, as accelerator co-processors or circuits in embodiments in which the sled 1200 is embodied as an accelerator sled, and/or storage controllers in embodiments in which the sled 1200 is embodied as a storage sled.

The sled 1200 also includes one or more additional physical resources 1230 mounted to the top side 1250 of the chassis-less circuit board substrate 1202. In the illustrative embodiment, the additional physical resources include a network interface controller (NIC) as discussed in more detail below. Of course, depending on the type and functionality of the sled 1200, the physical resources 1230 may include additional or other electrical components, circuits, and/or devices in other embodiments.

The physical resources 1220 are communicatively coupled to the physical resources 1230 via an input/output (I/O) subsystem 1222. The I/O subsystem 1222 may be embodied as circuitry and/or components to facilitate input/output operations with the physical resources 1220, the physical resources 1230, and/or other components of the sled 1200. For example, the I/O subsystem 1222 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In the illustrative embodiment, the I/O subsystem 1222 is embodied as, or otherwise includes, a double data rate 4 (DDR4) data bus or a DDR5 data bus.

In some embodiments, the sled 1200 may also include a controller-to-controller interconnect 1224. The controller-to-controller interconnect 1224 may be embodied as any type of communication interconnect capable of facilitating controller-to-controller communications. In the illustrative embodiment, the controller-to-controller interconnect 1224 is embodied as a high-speed point-to-point interconnect (e.g., faster than the I/O subsystem 1222). For example, the controller-to-controller interconnect 1224 may be embodied as a QuickPath Interconnect (QPI), an UltraPath Interconnect (UPI), or other high-speed point-to-point interconnect dedicated to controller-to-controller communications.

The sled 1200 also includes a power connector 1240 configured to mate with a corresponding power connector of the rack 102, 202, 302, 402, 902 when the sled 1200 is mounted in the corresponding rack 102, 202, 302, 402, 902. The sled 1200 receives power from a power supply of the rack 102, 202, 302, 402, 902 via the power connector 1240 to supply power to the various electrical components of the sled 1200. That is, the sled 1200 does not include any local power supply (i.e., an on-board power supply) to provide power to the electrical components of the sled 1200. The exclusion of a local or on-board power supply facilitates the reduction in the overall footprint of the chassis-less circuit board substrate 1202, which may increase the thermal cooling characteristics of the various electrical components mounted on the chassis-less circuit board substrate 1202 as discussed above.

In addition to lacking a local or on-board power supply, it should be appreciated that the illustrative sled 1200 also does not include a local or on-board cooling system to cool the electrical components of the sled 1200. That is, the sled 1200 does not include on-board fans or other active cooling devices or systems. For example, while the physical resources 1220 may include heatsinks or other passive cooing devices, the heatsinks of the physical resources 1220 do not include fans attached thereto. Additionally, because the chassis-less circuit board substrate 1202 does not include a housing or enclosure, there are no fans or other active cooling systems attached to a housing as is typical in standard servers. Rather, as discussed above, the rack 102, 202, 302, 402, 902 includes a fan array that operates to cool the sled 1200 by pulling air along the airflow path 1208.

In some embodiments, the sled 1200 may also include mounting features 1242 configured to mate with a mounting arm, or other structure, of a robot to facilitate the placement of the sled 1200 in a rack 102, 202, 302, 402, 902 by the robot. The mounting features 1242 may be embodied as any type of physical structures that allow the robot to grasp the sled 1200 without damaging the chassis-less circuit board substrate 1202 or the electrical components mounted thereto. For example, in some embodiments, the mounting features 1242 may be embodied as non-conductive pads attached to the chassis-less circuit board substrate 1202. In other embodiments, the mounting features may be embodied as brackets, braces, or other similar structures attached to the chassis-less circuit board substrate 1202. The particular number, shape, size, and/or make-up of the mounting feature 1242 may depend on the design of the robot configured to manage the sled 1200.

Referring now to FIG. 13, in addition to the physical resources 1230 mounted on the top side 1250 of the chassis-less circuit board substrate 1202, the sled 1200 also include one or more memory devices 1320 mounted to a bottom side 1350 of the chassis-less circuit board substrate 1202. That is, the chassis-less circuit board substrate 1202 is embodied as a double-sided circuit board. The physical resources 1220 are communicatively coupled to the memory devices 1320 via the I/O subsystem 1222. For example, the physical resources 1220 and the memory devices 1320 may be communicatively coupled by one or more vias extending through the chassis-less circuit board substrate 1202. Each physical resource 1220 may be communicatively coupled to a different set of one or more memory devices 1320 in some embodiments. Alternatively, in other embodiments, each physical resource 1220 may be communicatively coupled to each memory devices 1320.

The memory devices 1320 may be embodied as any type of memory device capable of storing data for the physical resources 1220 during operation of the sled 1200. For example, in the illustrative embodiments the memory devices 1320 are embodied as dual in-line memory modules (DIMMs), which may support DDR, DDR2, DDR3, DDR4, or DDR5 random access memory (RAM). Of course, in other embodiments, the memory devices 1320 may utilize other memory technologies, including volatile and/or non-volatile memory. For example, types of volatile memory may include, but are not limited to, data rate synchronous dynamic RAM (DDR SDRAM), static random-access memory (SRAM), thyristor RAM (T-RAM) or zero-capacitor RAM (Z-RAM). Types of non-volatile memory may include byte or block addressable types of non-volatile memory. The byte or block addressable types of non-volatile memory may include, but are not limited to, 3-dimensional (3-D) cross-point memory, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

Figure 14:
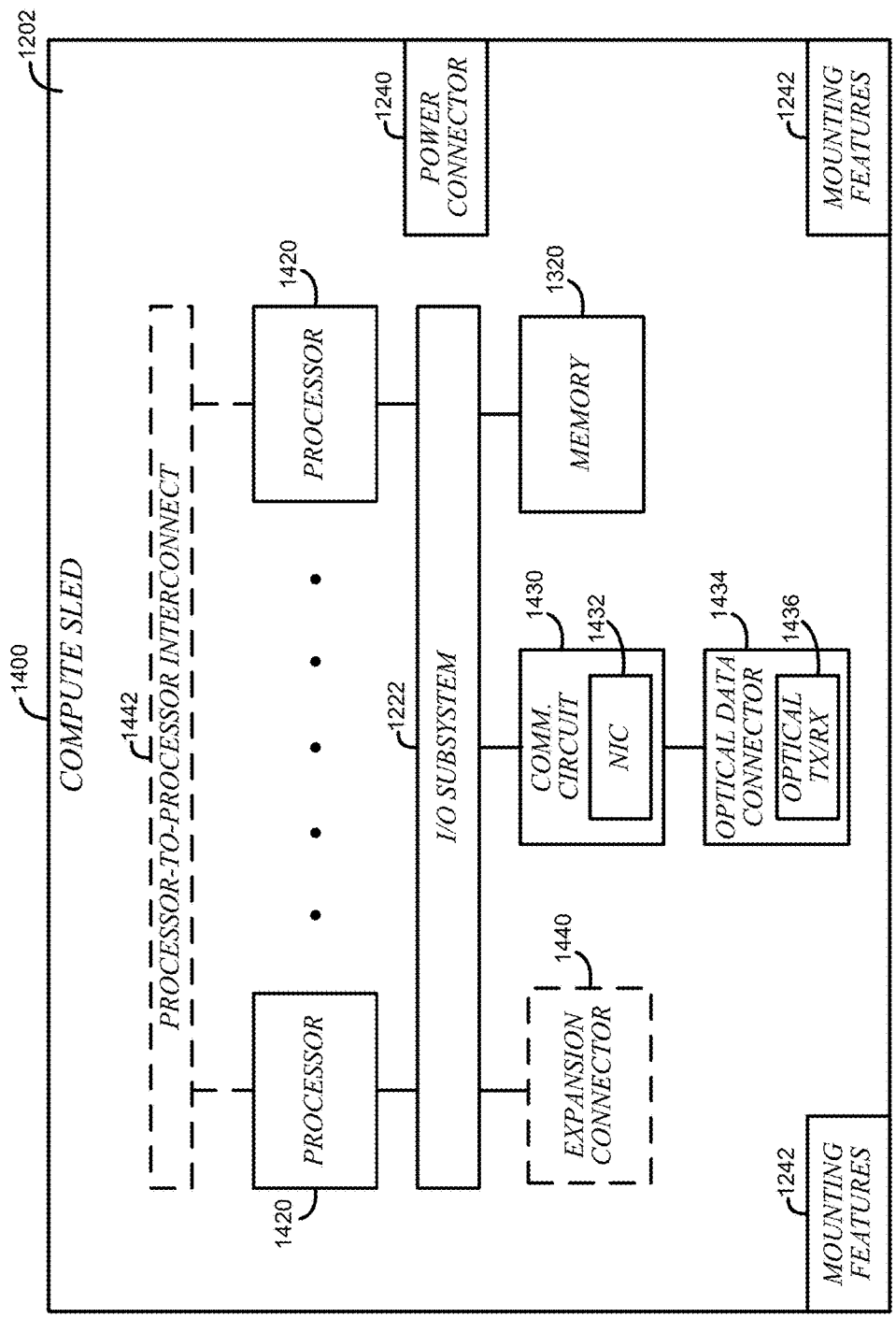
FIG. 14 is a simplified block diagram of at least one embodiment of a compute sled usable in the data center of FIGS. 1, 3, 4, and/or 11.

Referring now to FIG. 14, in some embodiments, the sled 1200 may be embodied as a compute sled 1400. The compute sled 1400 is optimized, or otherwise configured, to perform compute tasks. Of course, as discussed above, the compute sled 1400 may rely on other sleds, such as acceleration sleds and/or storage sleds, to perform such compute tasks. The compute sled 1400 includes various components similar to components of the sled 1200, which have been identified in FIG. 14 using the same reference number. The description of such components provided above in regard to FIGS. 12 and 13 applies to the corresponding components of the compute sled 1400 and is not repeated herein for clarity of the description of the compute sled 1400.

In the illustrative compute sled 1400, the physical resources 1220 are embodied as processors 1420. Although only two processors 1420 are shown in FIG. 14, it should be appreciated that the compute sled 1400 may include additional processors 1420 in other embodiments. Illustratively, the processors 1420 are embodied as high-power processors 1420 and may be configured to operate at a relatively high power rating. Although the processors 1420 generate additional heat operating at power ratings greater than typical processors (which operate at around 155-230 watts), the enhanced thermal cooling characteristics of the chassis-less circuit board substrate 1202 discussed above facilitate the higher power operation. For example, in the illustrative embodiment, the processors 1420 are configured to operate at a power rating of at least 250 watts. In some embodiments, the processors 1420 may be configured to operate at a power rating of at least 350 watts.

In some embodiments, the compute sled 1400 may also include a processor-to-processor interconnect 1442. Similar to the controller-to-controller interconnect 1224 of the sled 1200 discussed above, the processor-to-processor interconnect 1442 may be embodied as any type of communication interconnect capable of facilitating processor-to-processor interconnect 1442 communications. In the illustrative embodiment, the processor-to-processor interconnect 1442 is embodied as a high-speed point-to-point interconnect (e.g., faster than the I/O subsystem 1222). For example, the processor-to-processor interconnect 1442 may be embodied as a QuickPath Interconnect (QPI), an UltraPath Interconnect (UPI), or other high-speed point-to-point interconnect dedicated to processor-to-processor communications.

The compute sled 1400 also includes a communication circuit 1410. The illustrative communication circuit 1430 includes a network interface controller (NIC) 1432, which may also be referred to as a host fabric interface (HFI). The NIC 1432 may be embodied as, or otherwise include, any type of integrated circuit, discrete circuits, controller chips, chipsets, add-in-boards, daughtercards, network interface cards, other devices that may be used by the compute sled 1400 to connect with another compute device (e.g., with other sleds 1200). In some embodiments, the NIC 1432 may be embodied as part of a system-on-a-chip (SoC) that includes one or more processors, or included on a multichip package that also contains one or more processors. In some embodiments, the NIC 1432 may include a local processor (not shown) and/or a local memory (not shown) that are both local to the NIC 1432. In such embodiments, the local processor of the NIC 1432 may be capable of performing one or more of the functions of the processors 1420. Additionally or alternatively, in such embodiments, the local memory of the NIC 1432 may be integrated into one or more components of the compute sled at the board level, socket level, chip level, and/or other levels.

The communication circuit 1430 is communicatively coupled to an optical data connector 1434. The optical data connector 1434 is configured to mate with a corresponding optical data connector 1434 of the rack 102, 202, 302, 402, 902 when the compute sled 1400 is mounted in the rack 102, 202, 302, 402, 902. Illustratively, the optical data connector 1434 includes a plurality of optical fibers which lead from a mating surface of the optical data connector 1434 to an optical transceiver 1436. The optical transceiver 1436 is configured to convert incoming optical signals from the rack-side optical data connector to electrical signals and to convert electrical signals to outgoing optical signals to the rack-side optical data connector. Although shown as forming part of the optical data connector 1434 in the illustrative embodiment, the optical transceiver 1436 may form a portion of the communication circuit 1430 in other embodiments.

In some embodiments, the compute sled 1400 may also include an expansion connector 1440. In such embodiments, the expansion connector 1440 is configured to mate with a corresponding connector of an expansion chassis-less circuit board substrate to provide additional physical resources to the compute sled 1400. The additional physical resources may be used, for example, by the processors 1420 during operation of the compute sled 1400. The expansion chassis-less circuit board substrate may be substantially similar to the chassis-less circuit board substrate 1202 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 15:
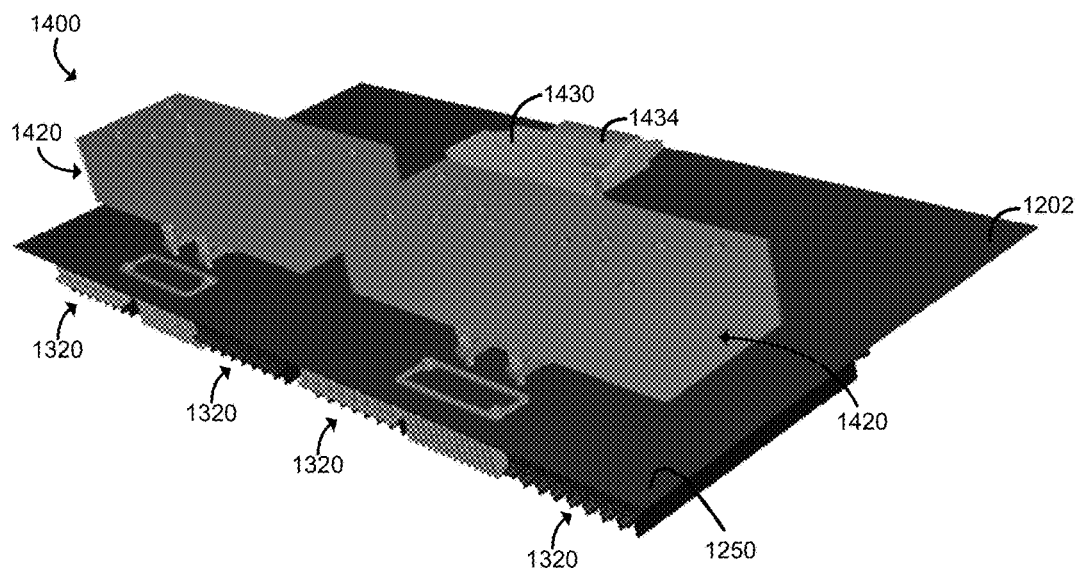
FIG. 15 is a top perspective view of at least one embodiment of the compute sled of FIG. 14.
Figure 16:
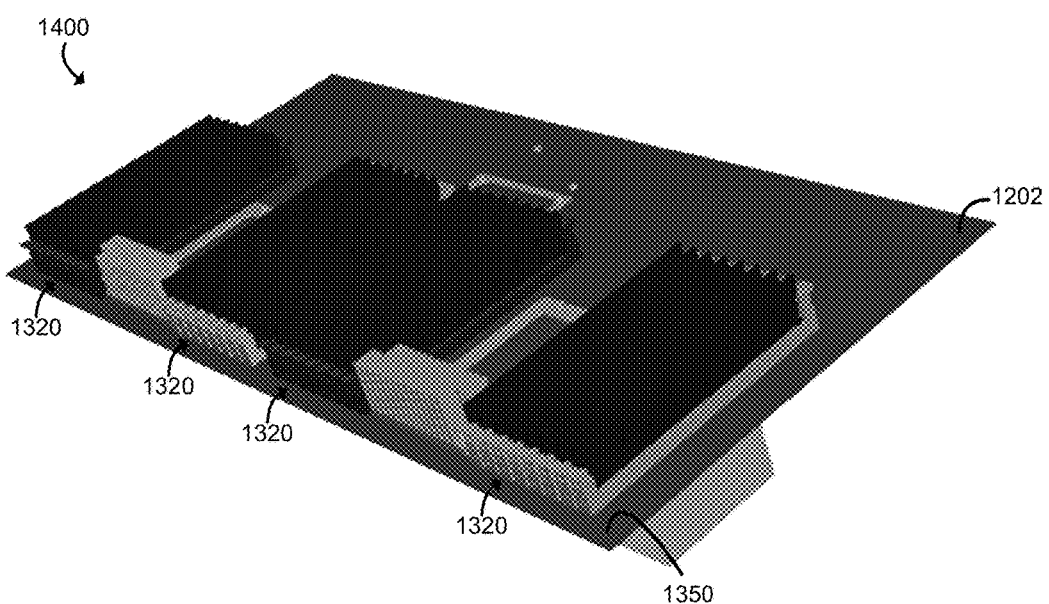
FIG. 16 is a bottom perspective view of the compute sled of FIG. 15.
Figure 17:
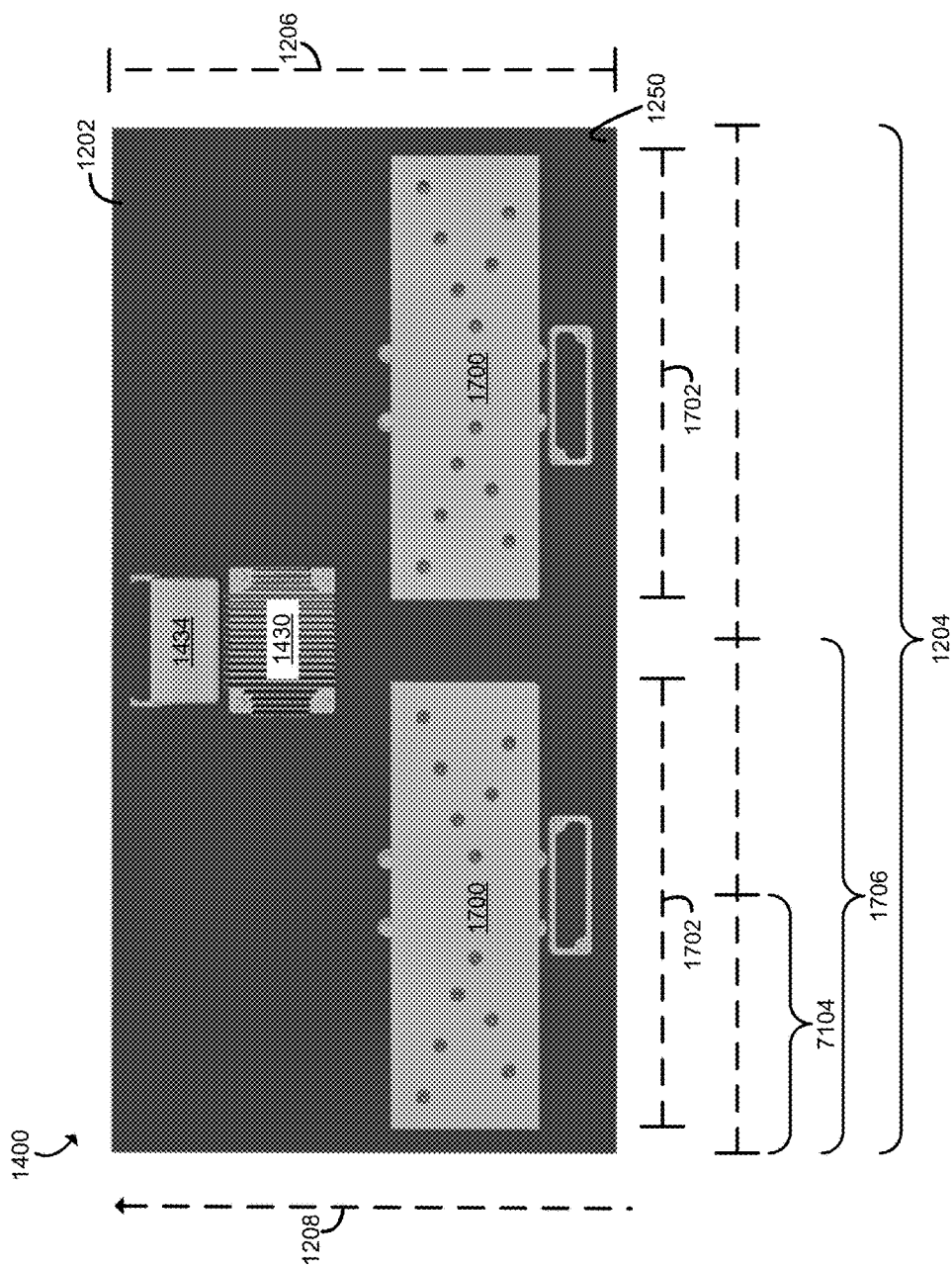
FIG. 17 is a top plan view of the compute sled of FIG. 15.
Figure 18:
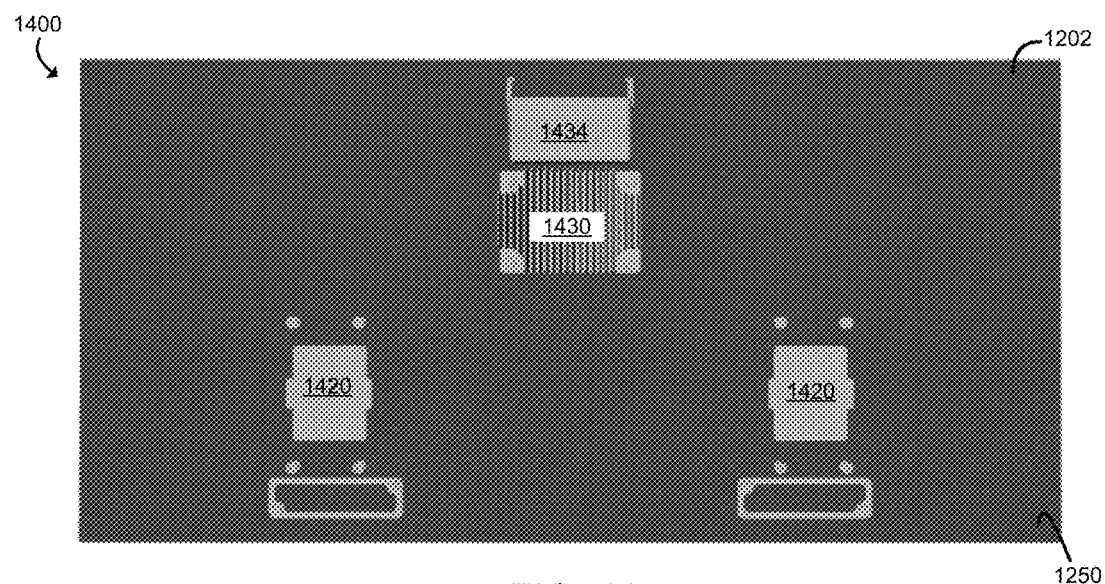
FIG. 18 is a top plan view of the compute sled of FIG. 15 having the processor heatsinks removed.

Referring now to FIGS. 15-19, an illustrative embodiment of the compute sled 1400 is shown. As shown in FIGS. 15, 17 and 18, the processors 1420, communication circuit 1430, and optical data connector 1434 are mounted to the top side 1250 of the chassis-less circuit board substrate 1202. Any suitable attachment or mounting technology may be used to mount the electrical components of the compute sled 1400 to the chassis-less circuit board substrate 1202. For example, the various components may be mounted in corresponding sockets (e.g., a processor socket), holders, or brackets. In some cases, some of the electrical components may be directly mounted to the chassis-less circuit board substrate 1202 via soldering or similar techniques.

As discussed above, the individual processors 1420 and communication circuit 1430 are mounted to the top side 1250 of the chassis-less circuit board substrate 1202 such that no two heat-producing, electrical components shadow each other. For example, as shown in FIG. 17, the processors 1420 and communication circuit 1430 are mounted in corresponding locations on the top side 1250 of the chassis-less circuit board substrate 1202 such that no two of those electrical components are linearly in-line with other along the direction of the airflow path 1208. It should be appreciated that, although the optical data connector 1434 is in-line with the communication circuit 1430, the optical data connector 1434 produces no or nominal heat during operation.

Figure 19:
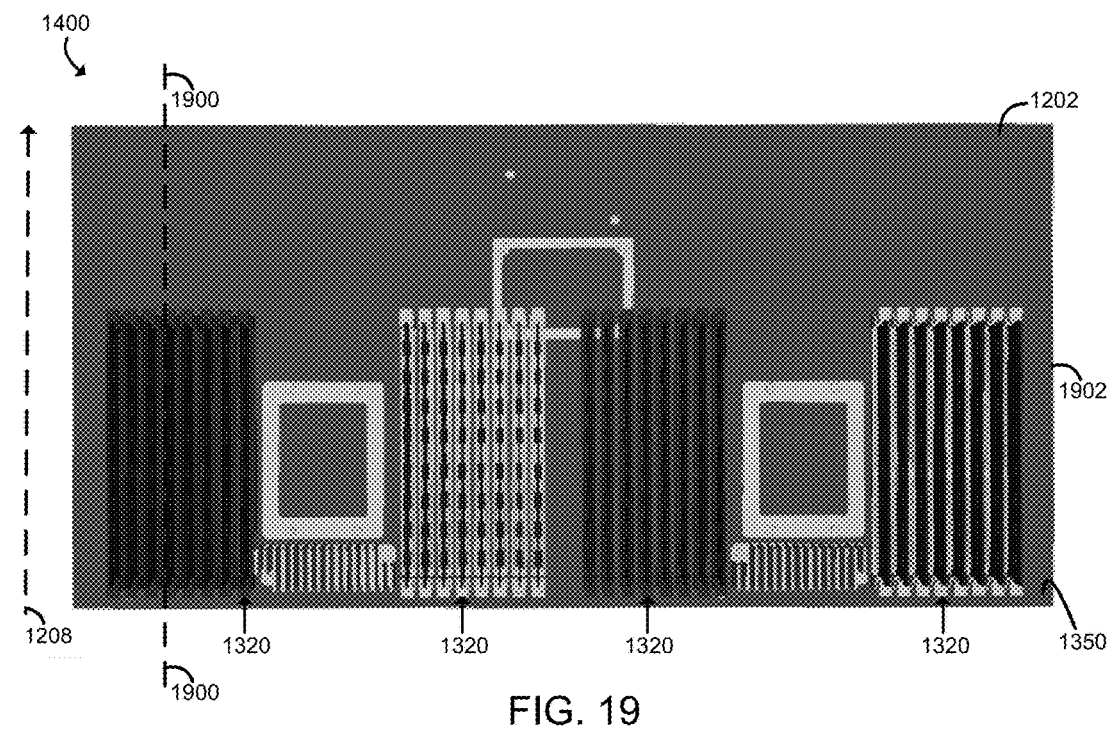
FIG. 19 is a bottom plan view of the compute sled of FIG. 15.

As shown in FIGS. 16 and 19, the memory devices 1320 of the compute sled 1400 are mounted to the bottom side 1350 of the of the chassis-less circuit board substrate 1202 as discussed above in regard to the sled 1200. Although mounted to the bottom side 1350, the memory devices 1320 are communicatively coupled to the processors 1420 located on the top side 1250 via the I/O subsystem 1222. Because the chassis-less circuit board substrate 1202 is embodied as a double-sided circuit board, the memory devices 1320 and the processors 1420 may be communicatively coupled by one or more vias extending through the chassis-less circuit board substrate 1202. Of course, each processor 1420 may be communicatively coupled to a different set of one or more memory devices 1320 in some embodiments. Alternatively, in other embodiments, each processor 1420 may be communicatively coupled to each memory devices 1320.

As best shown in FIG. 19 and similar to the processors 1420 and communication circuit 1430, the memory devices 1320 are mounted to the bottom side 1350 of the chassis-less circuit board substrate 1202 such that no two memory devices shadow each other. That is, memory devices 1320 are mounted in corresponding locations on the bottom side 1350 of the chassis-less circuit board substrate 1202 such that no two of memory devices 1320 are linearly in-line with other along the direction of the airflow path 1208. Additionally, in the illustrative embodiment of FIG. 19, the memory devices 1320 are embodied as dual in-line memory modules (DIMMs) and are mounted to the bottom side 1350 of the chassis-less circuit board substrate 1202 such that a longitudinal axis 1900 of the memory devices 1320 is substantially parallel to a side edge 1902 of the chassis-less circuit board substrate 1202 and the airflow path 1208. In this configuration, the airflow path 1208 travels along the length of the DIMM memory devices 1320, which may improve the cooling characteristics of the memory devices 1320.

Referring back to FIG. 17, each of the processors 1420 include a heatsink 1700 secured thereto. Due to the mounting of the memory devices 1350 to the bottom side 1350 of the chassis-less circuit board substrate 1202 (as well as the vertical spacing of the sleds 1200 in the corresponding rack 102, 202, 302, 402, 902), the top side 1250 of the chassis-less circuit board substrate 1202 includes additional "free" area or space that facilitates the use of heatsinks 1700 having a larger size relative to traditional heatsinks used in typical servers. That is, the heatsinks 1700 may be oversized relative to traditional heatsinks. For example, in the illustrative embodiment of FIG. 17, each heatsink 1700 has a substantially rectangular top profile shape having a length 1702. Each heatsink 1700 is sized such that its length 1702 is greater than one-quarter width 1704 of the width 1204 of the chassis-less circuit board substrate 1202. Additionally, the sum of the lengths 1702 of the heatsinks 1700 is greater than one-half width 1706 of the width 1204 of the chassis-less circuit board substrate 1202. Of course, heatsinks 1700 having different dimensions may be used in other embodiments. Additionally, as discussed above, due to the improved thermal cooling characteristics of the chassis-less circuit board substrate 1202, none of the processor heatsinks 1700 include cooling fans attached thereto. That is, each of the heatsinks 1700 is embodied as fan-less heatsinks.

Figure 20:
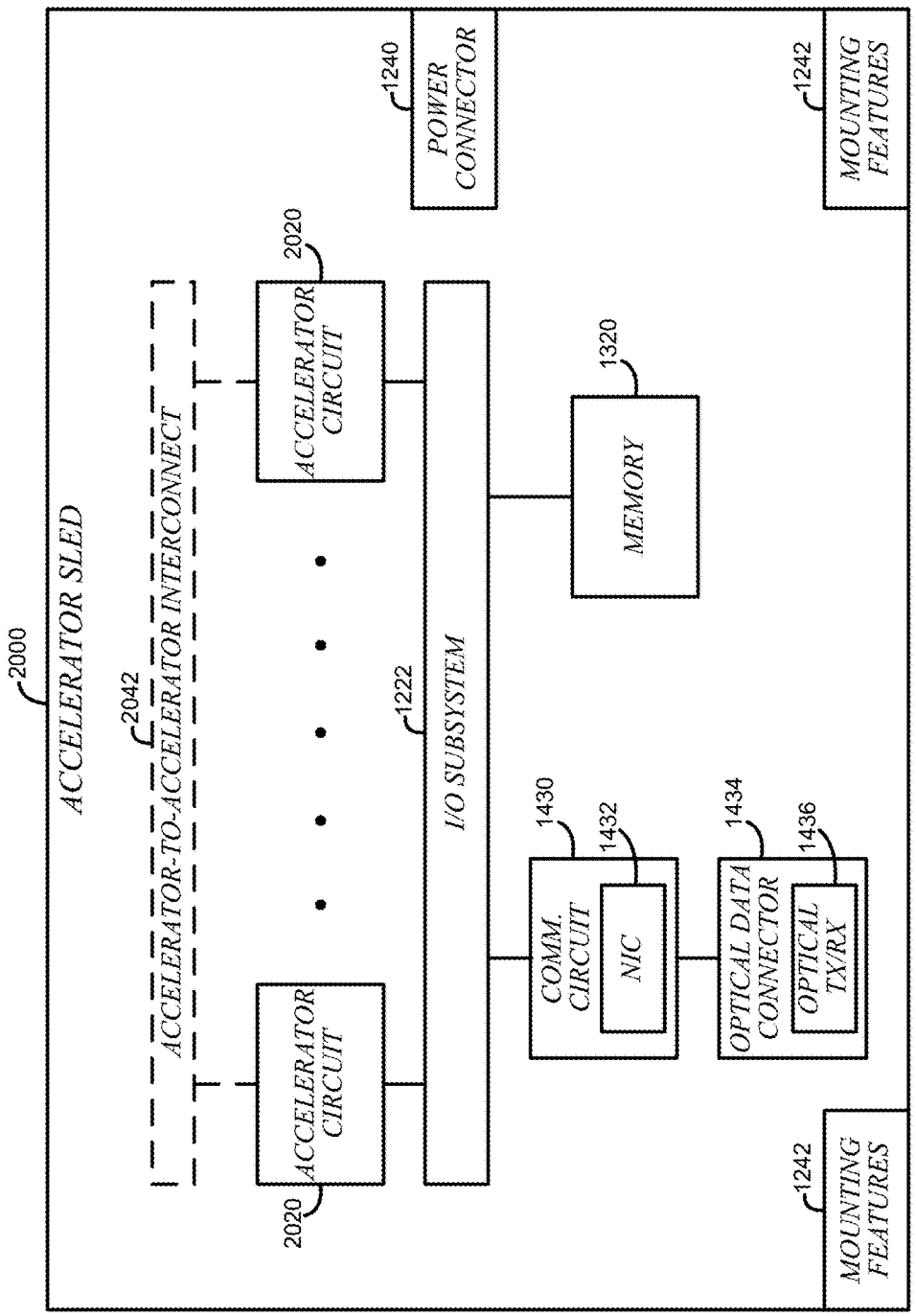
FIG. 20 is a simplified block diagram of at least one embodiment of an accelerator sled usable in the data center of FIGS. 1, 3, 4, and/or 11.

Referring now to FIG. 20, in some embodiments, the sled 1200 may be embodied as an accelerator sled 2000. The accelerator sled 2000 is optimized, or otherwise configured, to perform specialized compute tasks, such as machine learning, encryption, hashing, or other computational-intensive task. In some embodiments, for example, a compute sled 1400 may offload tasks to the accelerator sled 2000 during operation. The accelerator sled 2000 includes various components similar to components of the sled 1200 and/or compute sled 1400, which have been identified in FIG. 20 using the same reference number. The description of such components provided above in regard to FIGS. 12, 13, and 14 apply to the corresponding components of the accelerator sled 2000 and is not repeated herein for clarity of the description of the accelerator sled 2000.

In the illustrative accelerator sled 2000, the physical resources 1220 are embodied as accelerator circuits 2020.

Figure 23:
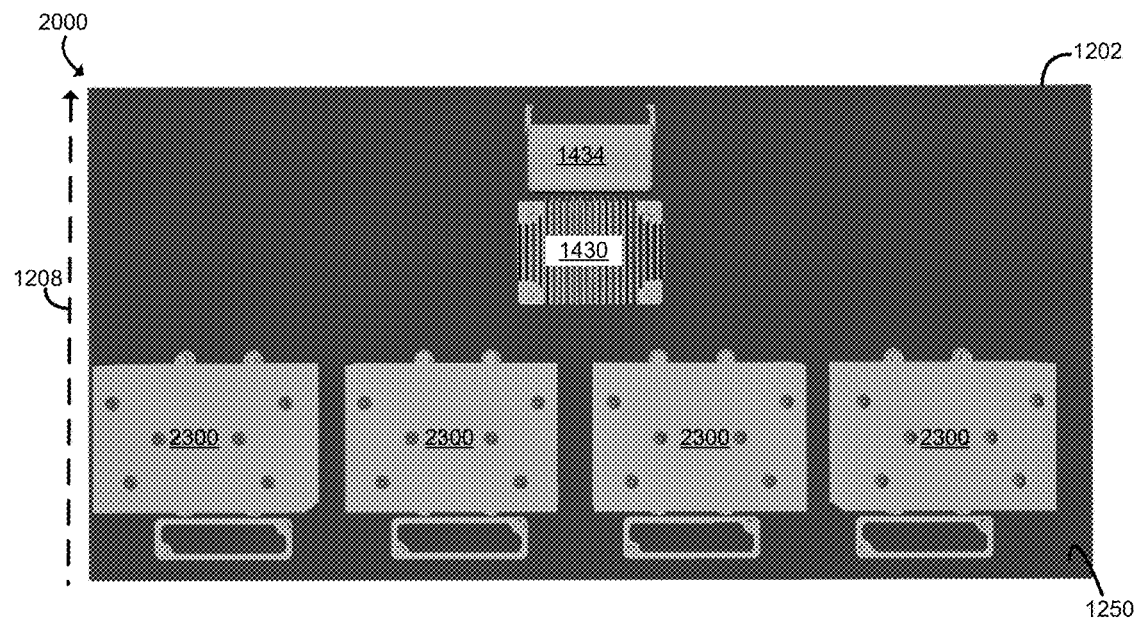
FIG. 23 is a top plan view of the accelerator sled of FIG. 21.

Although only two accelerator circuits 2020 are shown in FIG. 20, it should be appreciated that the accelerator sled 2000 may include additional accelerator circuits 2020 in other embodiments. For example, as shown in FIG. 23, the accelerator sled 2000 may include four accelerator circuits 2020 in some embodiments. The accelerator circuits 2020 may be embodied as any type of processor, co-processor, compute circuit, or other device capable of performing compute or processing operations. For example, the accelerator circuits 2020 may be embodied as, for example, field programmable gate arrays (FPGA), application-specific integrated circuits (ASICs), security co-processors, graphics processing units (GPUs), machine learning circuits, or other specialized processors, controllers, devices, and/or circuits.

In some embodiments, the compute sled 1400 may also include an accelerator-to-accelerator interconnect 2042. Similar to the controller-to-controller interconnect 1224 of the sled 1200 discussed above, the accelerator-to-accelerator interconnect 2042 may be embodied as any type of communication interconnect capable of facilitating accelerator-to-accelerator communications. In the illustrative embodiment, the accelerator-to-accelerator interconnect 2042 is embodied as a high-speed point-to-point interconnect (e.g., faster than the I/O subsystem 1222). For example, the accelerator-to-accelerator interconnect 2042 may be embodied as a QuickPath Interconnect (QPI), an UltraPath Interconnect (UPI), or other high-speed point-to-point interconnect dedicated to processor-to-processor communications.

Figure 21:
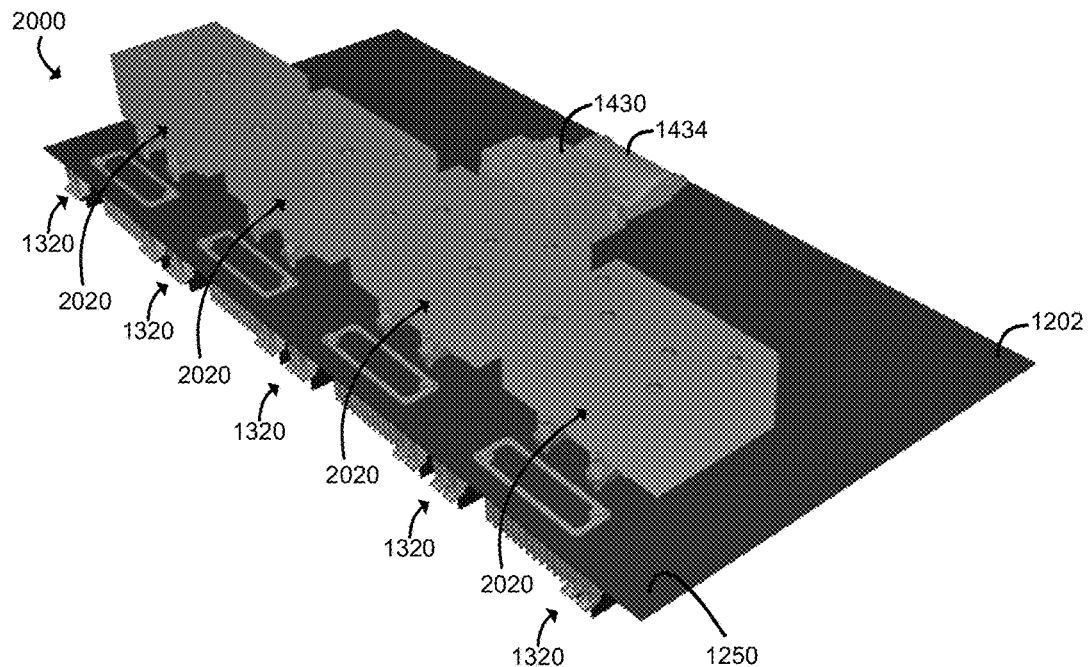
FIG. 21 is a top perspective view of at least one embodiment of the accelerator sled of FIG. 20.

Referring now to FIGS. 21-24, an illustrative embodiment of the accelerator sled 2000 is shown. As shown in FIGS. 21 and 23, the accelerator circuits 2020, communication circuit 1430, and optical data connector 1434 are mounted to the top side 1250 of the chassis-less circuit board substrate 1202. Again, as discussed above, any suitable attachment or mounting technology may be used to mount the electrical components of the accelerator sled 2000 to the chassis-less circuit board substrate 1202 including, for example, sockets (e.g., a processor socket), holders, brackets, soldered connections, and/or other mounting or securing techniques.

As discussed above, the individual accelerator circuits 2020 and communication circuit 1430 are mounted to the top side 1250 of the chassis-less circuit board substrate 1202 such that no two heat-producing, electrical components shadow each other. For example, as shown in FIG. 23, the accelerator circuits 2020 and communication circuit 1430 are mounted in corresponding locations on the top side 1250 of the chassis-less circuit board substrate 1202 such that no two of those electrical components are linearly in-line with other along the direction of the airflow path 1208. Again, it should be appreciated that, although the optical data connector 1434 is in-line with the communication circuit 1430, the optical data connector 1434 produces no or nominal heat during operation.

Figure 22:
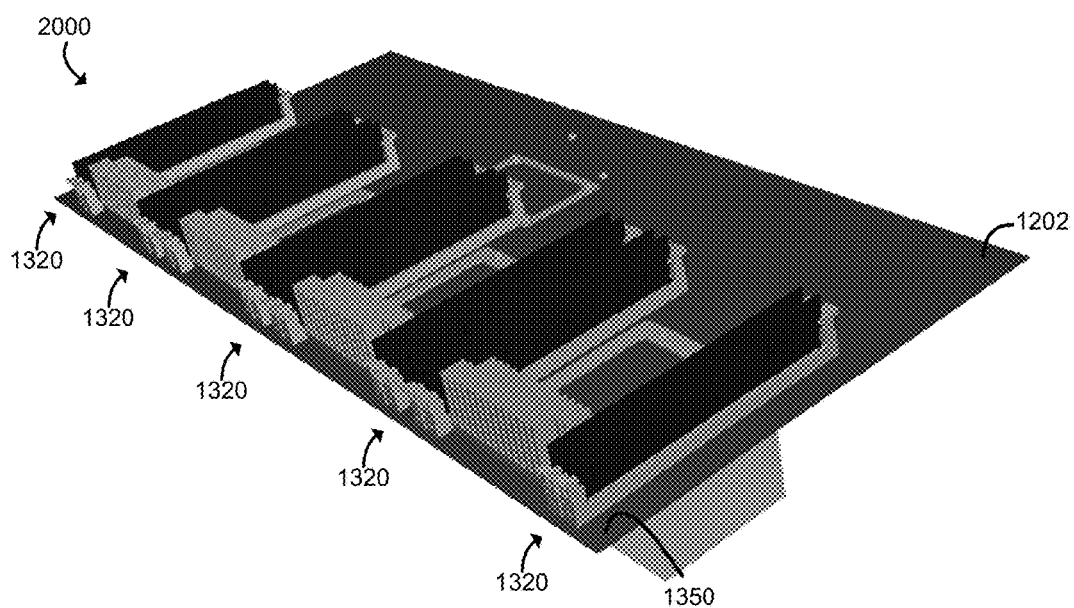
FIG. 22 is a bottom perspective view of the accelerator sled of FIG. 21.
Figure 24:
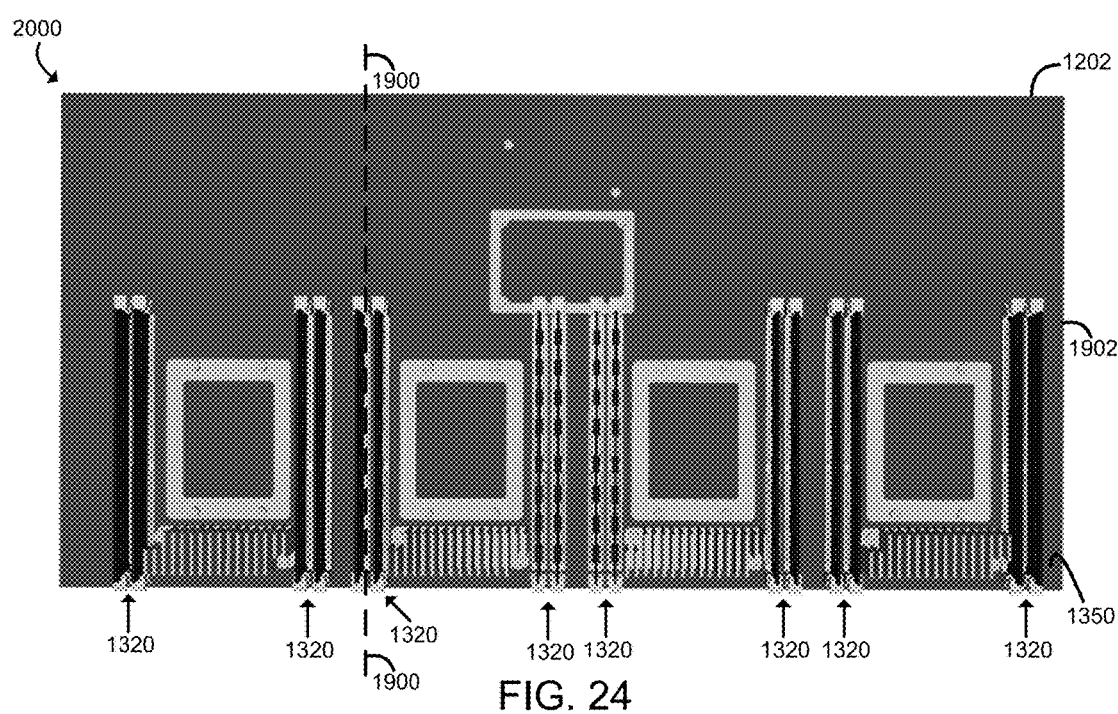
FIG. 24 is a bottom plan view of the accelerator sled of FIG. 21.

As shown in FIGS. 22 and 24, the memory devices 1320 of the accelerator sled 2000 are mounted to the bottom side 1350 of the of the chassis-less circuit board substrate 1202 as discussed above in regard to the sled 1200. Although mounted to the bottom side 1350, the memory devices 1320 are communicatively coupled to the accelerator circuits 2020 located on the top side 1250 via the I/O subsystem 1222. Again, because the chassis-less circuit board substrate 1202 is embodied as a double-sided circuit board, the memory devices 1320 and the accelerator circuits 2020 may be communicatively coupled by one or more vias extending through the chassis-less circuit board substrate 1202. Of course, each accelerator circuit 2020 may be communicatively coupled to a different set of one or more memory devices 1320 in some embodiments. Alternatively, in other embodiments, each accelerator circuit 2020 may be communicatively coupled to each memory devices 1320.

As best shown in FIG. 24 and similar to the accelerator circuits 2020 and communication circuit 1430, the memory devices 1320 of the accelerator sled 2000 are mounted to the bottom side 1350 of the chassis-less circuit board substrate 1202 such that no two memory devices 1320 shadow each other. That is, the memory devices 1320 are mounted in corresponding locations on the bottom side 1350 of the chassis-less circuit board substrate 1202 such that no two of memory devices 1320 are linearly in-line with other along the direction of the airflow path 1208. Additionally, similar to the compute sled 1400, the memory devices 1320 of the accelerator sled 2000 are embodied as dual in-line memory modules (DIMMs) in the illustrative embodiment as shown in FIG. 24. The DIMM memory devices 1320 are mounted to the bottom side 1350 of the chassis-less circuit board substrate 1202 such that the longitudinal axis 1900 of the memory devices 1350 is substantially parallel to the side edge 1902 of the chassis-less circuit board substrate 1202 and the airflow path 1208.

Referring back to FIG. 23, each of the accelerator circuits 2020 includes a heatsink 2300 secured thereto. Again due to the mounting of the memory devices 1350 to the bottom side 1350 of the chassis-less circuit board substrate 1202, the top side 1250 of the chassis-less circuit board substrate 1202 includes additional "free" area or space that facilitates the use of heatsinks 2300 having a larger size relative to traditional heatsinks used in typical servers. That is, the heatsinks 2300 may be oversized relative to traditional heatsinks of specialized processors, co-processors, or similar circuits. Additionally, as discussed above, due to the improved thermal cooling characteristics of the chassis-less circuit board substrate 1202, none of the heatsinks 2300 include cooling fans attached thereto. That is, each of the heatsinks 2300 is embodied as fan-less heatsinks.

Figure 25:
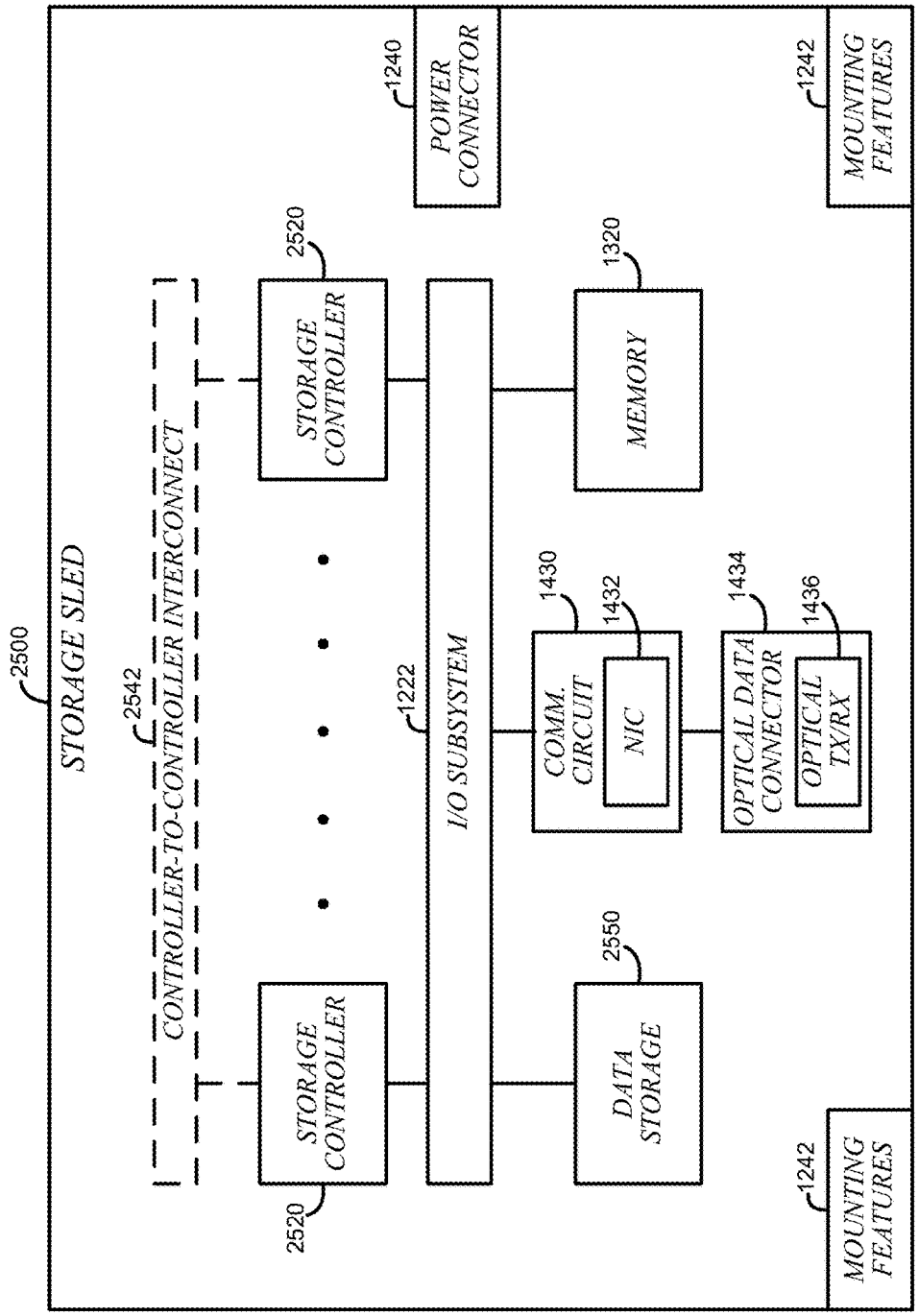
FIG. 25 is a simplified block diagram of at least one embodiment of an storage sled usable in the data center of FIGS. 1, 3, 4, and/or 11.

Referring now to FIG. 25, in some embodiments, the sled 1200 may be embodied as a storage sled 2500. The storage sled 2500 is optimized, or otherwise configured, to store data in a data storage 2550 local to the storage sled 2500. For example, during operation, a compute sled 1400 or an accelerator sled 2000 may store and retrieve data from the data storage 2250 of the storage sled 2500. The storage sled 2500 includes various components similar to components of the sled 1200 and/or the compute sled 1400, which have been identified in FIG. 25 using the same reference number. The description of such components provided above in regard to FIGS. 12, 13, and 14 apply to the corresponding components of the storage sled 2500 and is not repeated herein for clarity of the description of the storage sled 2500.

In the illustrative storage sled 2500, the physical resources 1220 are embodied as storage controllers 2520. Although only two storage controllers 2520 are shown in FIG. 25, it should be appreciated that the storage sled 2500 may include additional storage controllers 2520 in other embodiments. The storage controllers 2520 may be embodied as any type of processor, controller, or control circuit capable of controlling the storage and retrieval of data into the data storage 2550 based on requests received via the communication circuit 1430. In the illustrative embodiment, the storage controllers 2520 are embodied as relatively low-power processors or controllers. For example, in some embodiments, the storage controllers 2520 may be configured to operate at a power rating of about 75 watts.

In some embodiments, the compute sled 1400 may also include a controller-to-controller 2542. Similar to the controller-to-controller interconnect 1224 of the sled 1200 discussed above, the controller-to-controller 2542 may be embodied as any type of communication interconnect capable of facilitating controller-to-controller communications. In the illustrative embodiment, the controller-to-controller 2542 is embodied as a high-speed point-to-point interconnect (e.g., faster than the I/O subsystem 1222). For example, the controller-to-controller 2542 may be embodied as a QuickPath Interconnect (QPI), an UltraPath Interconnect (UPI), or other high-speed point-to-point interconnect dedicated to processor-to-processor communications.

Referring now to FIGS. 21-24, an illustrative embodiment of the storage sled 2500 is shown. In the illustrative embodiment, the data storage 2550 is embodied as, or otherwise includes, a storage cage 2552 configured to house one or more solid state drives (SSDs) 2554. To do so, the storage cage 2552 includes a number of mounting slots 2556, each of which is configured to receive a corresponding solid state drive 2554. Each of the mounting slots 2556 includes a number of drive guides 2558 that cooperate to define an access opening 2560 of the corresponding mounting slot 2556. The storage cage 2552 is secured to the chassis-less circuit board substrate 1202 such that the access openings face away from (i.e., toward the front of) the chassis-less circuit board substrate 1202. As such, solid state drives 2554 are accessible while the storage sled 2500 is mounted in a corresponding rack 102, 202, 302, 402, 902. For example, a solid state drive 2554 may be swapped out of a rack 102, 202, 302, 402, 902 (e.g., via a robot) while the storage sled 2500 remains mounted in the corresponding rack 102, 202, 302, 402, 902.

The storage cage 2552 illustratively includes sixteen mounting slots 2556 and is capable of mounting and storing sixteen solid state drives 2554. Of course, the storage cage 2552 may be configured to store additional or fewer solid state drives 2554 in other embodiments. Additionally, in the illustrative embodiment, the solid state drivers are mounted vertically in the storage cage 2552, but may be mounted in the storage cage 2552 in a different orientation in other embodiments. Each solid state drive 2554 may be embodied as any type of data storage device capable of storing long term data. To do so, the solid state drives 2554 may include volatile and non-volatile memory devices. For example, types of volatile memory may include, but are not limited to, data rate synchronous dynamic RAM (DDR SDRAM), static random-access memory (SRAM), thyristor RAM (T-RAM) or zero-capacitor RAM (Z-RAM). Types of non-volatile memory may include byte or block addressable types of non-volatile memory. The byte or block addressable types of non-volatile memory may include, but are not limited to, 3-dimensional (3-D) cross-point memory, memory that uses chalcogenide phase change material (e.g., chalcogenide glass), multi-threshold level NAND flash memory, NOR flash memory, single or multi-level phase change memory (PCM), resistive memory, nanowire memory, ferroelectric transistor random access memory (FeTRAM), magnetoresistive random access memory (MRAM) memory that incorporates memristor technology, or spin transfer torque MRAM (STT-MRAM), or a combination of any of the above, or other non-volatile memory types.

Figure 26:
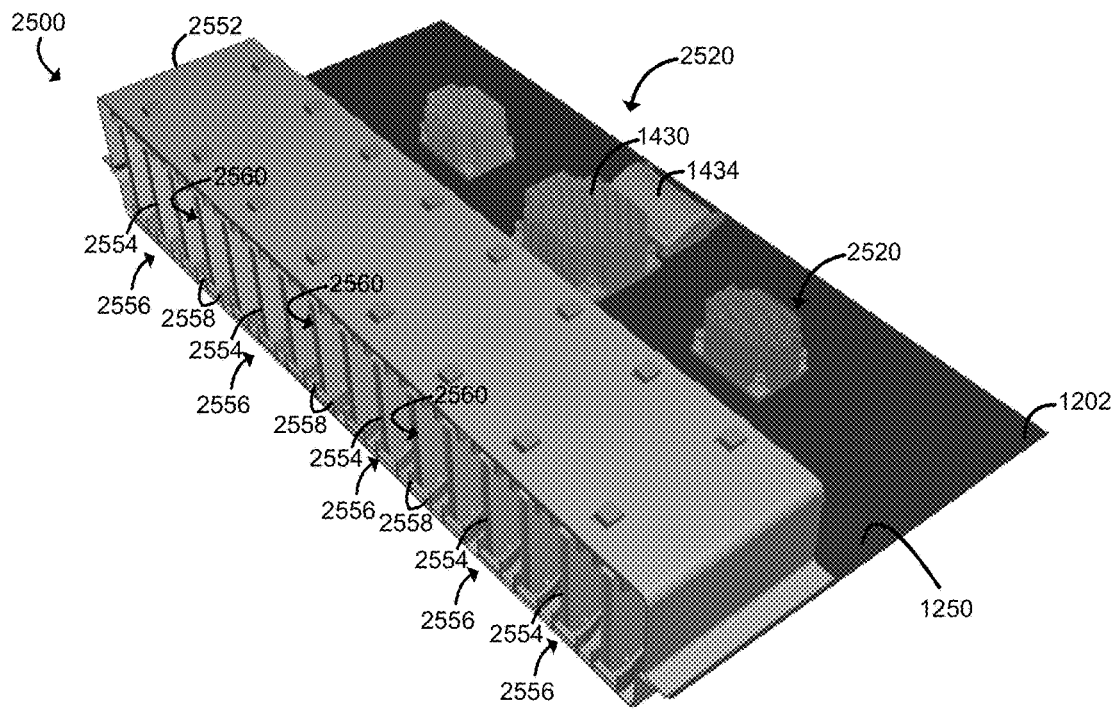
FIG. 26 is a top perspective view of at least one embodiment of the storage sled of FIG. 25.
Figure 28:
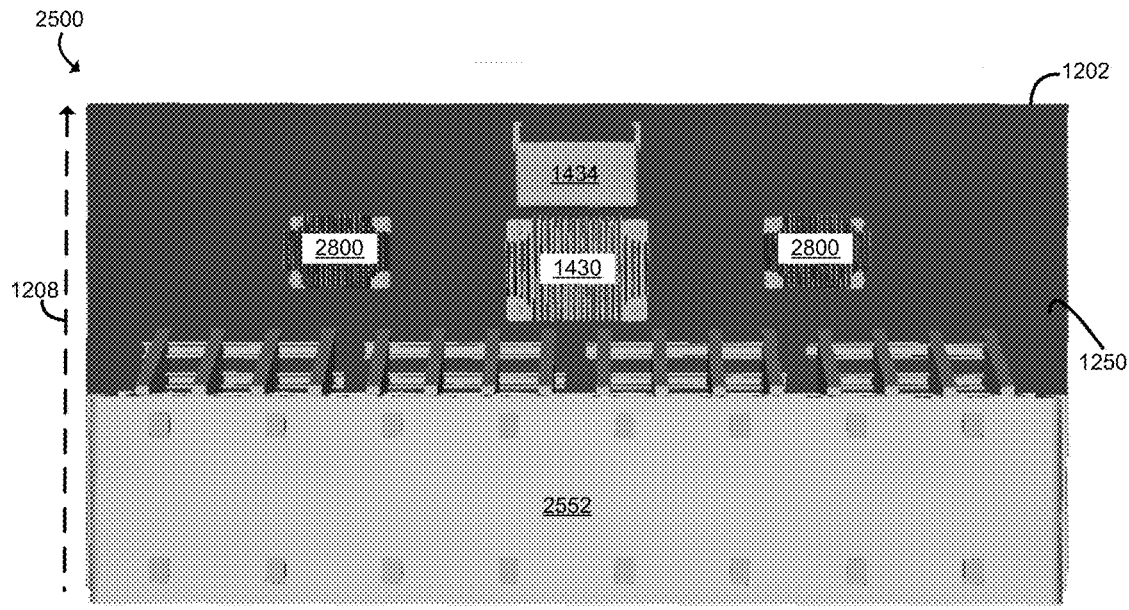
FIG. 28 is a top plan view of the storage sled of FIG. 26.

As shown in FIGS. 26 and 28, the storage controllers 2520, the communication circuit 1430, and the optical data connector 1434 are mounted to the top side 1250 of the chassis-less circuit board substrate 1202. Again, as discussed above, any suitable attachment or mounting technology may be used to mount the electrical components of the storage sled 2500 to the chassis-less circuit board substrate 1202 including, for example, sockets (e.g., a processor socket), holders, brackets, soldered connections, and/or other mounting or securing techniques.

As discussed above, the individual storage controllers 2520 and the communication circuit 1430 are mounted to the top side 1250 of the chassis-less circuit board substrate 1202 such that no two heat-producing, electrical components shadow each other. For example, as shown in FIG. 28, the storage controllers 2520 and the communication circuit 1430 are mounted in corresponding locations on the top side 1250 of the chassis-less circuit board substrate 1202 such that no two of those electrical components are linearly in-line with other along the direction of the airflow path 1208. Again, it should be appreciated that, although the optical data connector 1434 is in-line with the communication circuit 1430, the optical data connector 1434 produces no or nominal heat during operation.

Figure 27:
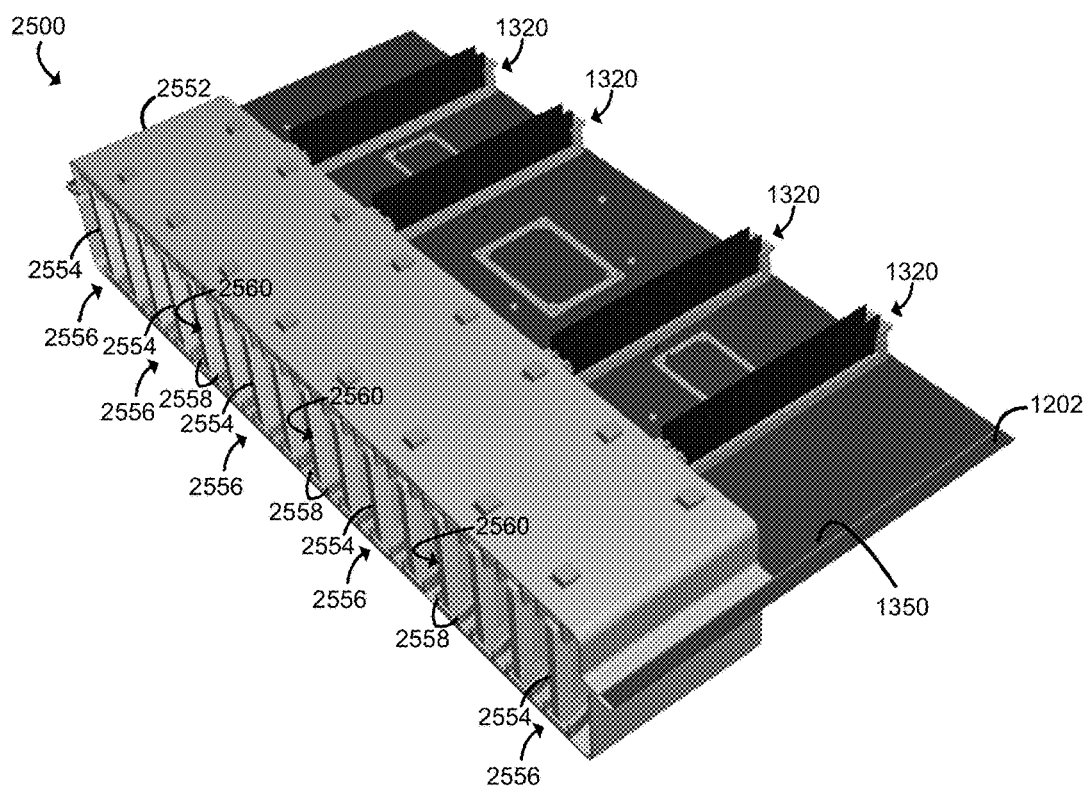
FIG. 27 is a bottom perspective view of the storage sled of FIG. 26.
Figure 29:
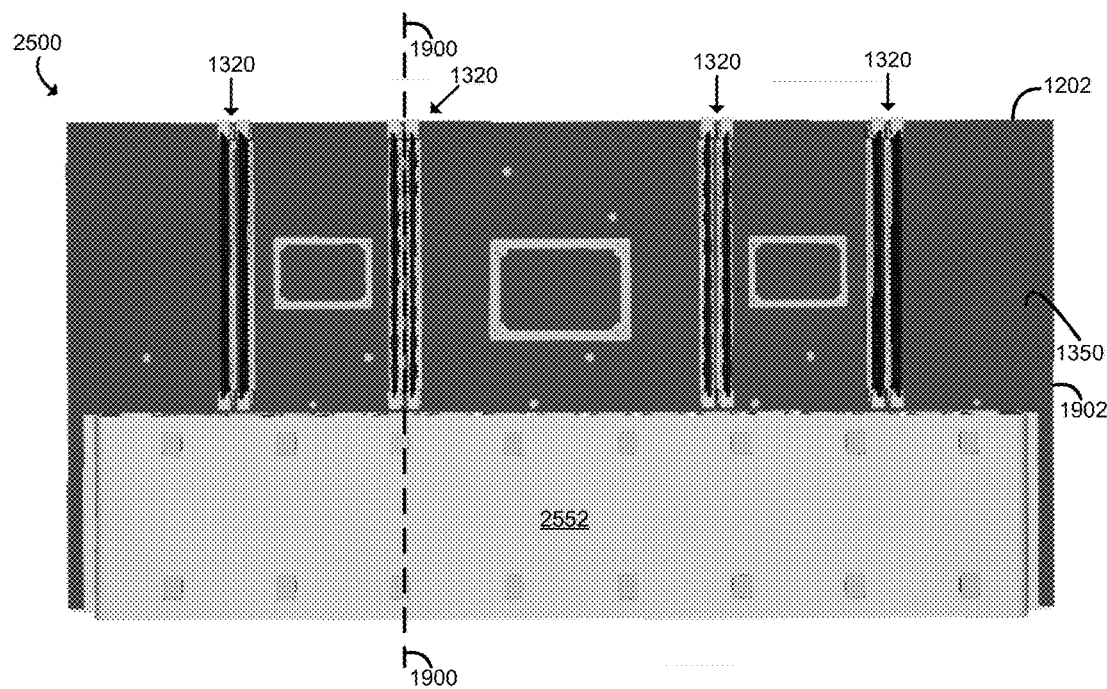
FIG. 29 is a bottom plan view of the storage sled of FIG. 26.

As shown in FIGS. 27 and 29, the memory devices 1320 of the storage sled 2500 are mounted to the bottom side 1350 of the of the chassis-less circuit board substrate 1202 as discussed above in regard to the sled 1200. Although mounted to the bottom side 1350, the memory devices 1320 are communicatively coupled to the storage controllers 2520 located on the top side 1250 via the I/O subsystem 1222. Again, because the chassis-less circuit board substrate 1202 is embodied as a double-sided circuit board, the memory devices 1320 and the storage controllers 2520 may be communicatively coupled by one or more vias extending through the chassis-less circuit board substrate 1202. Of course, each storage controller 2520 may be communicatively coupled to a different set of one or more memory devices 1320 in some embodiments. Alternatively, in other embodiments, each storage controller 2520 may be communicatively coupled to each memory devices 1320.

As best shown in FIG. 29 and similar to the storage controllers 2520 and communication circuit 1430, the memory devices 1320 of the storage sled 2500 are mounted to the bottom side 1350 of the chassis-less circuit board substrate 1202 such that no two memory devices 1320 shadow each other. That is, the memory devices 1320 are mounted in corresponding locations on the bottom side 1350 of the chassis-less circuit board substrate 1202 such that no two of memory devices 1320 are linearly in-line with other along the direction of the airflow path 1208. Additionally, similar to the compute sled 1400, the memory devices 1320 of the storage sled 2500 are embodied as dual in-line memory modules (DIMMs) in the illustrative embodiment as shown in FIG. 24. The DIMM memory devices 1320 are mounted to the bottom side 1350 of the chassis-less circuit board substrate 1202 such that the longitudinal axis 1900 of the memory devices 1350 is substantially parallel to the side edge 1902 of the chassis-less circuit board substrate 1202 and the airflow path 1208.

Referring back to FIG. 28, each of the storage controllers 2520 includes a heatsink 2800 secured thereto. As discussed above, due to the improved thermal cooling characteristics of the chassis-less circuit board substrate 1202 of the storage sled 2500, none of the heatsinks 2800 include cooling fans attached thereto. That is, each of the heatsinks 2800 is embodied as fan-less heatsinks.

It should be appreciated that the various sleds 1200, 1400, 2000, 2500 may have configurations and topologies different from the illustrative embodiments described herein in other embodiments. As such, it should be appreciated that the component diagrams illustrated in FIGS. 12, 13, 14, 20, and 25 are merely illustrative logical representations of the corresponding sleds and are not limiting. For example, although particular components of the sleds 1200, 1400, 2000, 2500 have been described as being mounted on the top side 1250 or bottom side 1350 of the chassis-less circuit board substrate 1202, such components may be mounted on the other side of the chassis-less circuit board substrate 1202 in other embodiments.

EXAMPLES

Illustrative examples of the technologies disclosed herein are provided below. An embodiment of the technologies may include any one or more, and any combination of, the examples described below.

Example 1 includes a sled for operation in a rack of a data center, the sled comprising a chassis-less circuit board substrate having a top side and a bottom side opposite the top side; one or more physical resources coupled to the top side of the chassis-less circuit board substrate; and one or more memory devices coupled to the bottom side of the chassis-less circuit board substrate, wherein each of the one or more memory devices is electrically coupled to at least one of the one or more physical resources.

Example 2 includes the subject matter of Example 1, and wherein the chassis-less circuit board substrate is formed from an FR-4 material.

Example 3 includes the subject matter of any of Examples 1 and 2, and wherein the chassis-less circuit board substrate is exposed to the local environment.

Example 4 includes the subject matter of any of Examples 1-3, and wherein the chassis-less circuit board includes no backplane.

Example 5 includes the subject matter of any of Examples 1-4, and wherein the chassis-less circuit board includes no active cooling system to cool the one or more physical resources or the one or more memory devices during operation of the sever sled.

Example 6 includes the subject matter of any of Examples 1-5, and further including a plurality of electrical components, including the one or more physical resources and the one or more memory devices, wherein no electrical component of the sled is cooled by an active cooling system of the sled during operation of the sled.

Example 7 includes the subject matter of any of Examples 1-6, and wherein the chassis-less circuit board substrate includes no power supply to supply power to the one or more physical resources or the one or more memory devices.

Example 8 includes the subject matter of any of Examples 1-7, and further including a power connector to mate with a corresponding power connector of the rack to provide power to the electrical components of the sled.

Example 9 includes the subject matter of any of Examples 1-8, and further including a plurality of electrical components, including the one or more physical resources and the one or more memory devices, coupled to the chassis-less circuit board substrate, wherein no electrical component of the sled receives power from a power supply of the sled during operation of the sled.

Example 10 includes the subject matter of any of Examples 1-9, and further including a plurality of electrical components, including the one or more physical resources and the one or more memory devices, coupled to the chassis-less circuit board substrate, wherein no two electrical components of the plurality of electrical components that produce non-nominal heat during operation shadow each other along a direction that extends from a front edge of the chassis-less circuit board substrate to a back edge of the chassis-less circuit board substrate.

Example 11 includes the subject matter of any of Examples 1-10, and wherein the chassis-less circuit board substrate has a rectangular shape having a width and a depth, and the width of the chassis-less circuit board substrate is greater than the depth of the chassis-less circuit board.

Example 12 includes the subject matter of any of Examples 1-11, and wherein the width is about twenty-one inches and the depth is about nine inches.

Example 13 includes the subject matter of any of Examples 1-12, and further including a network interface controller coupled to the top side of the chassis-less circuit board substrate.

Example 14 includes the subject matter of any of Examples 1-13, and wherein the network interface controller includes an optical communicator.

Example 15 includes the subject matter of any of Examples 1-14, and further including an optical data connector secured to the top side of the chassis-less circuit board substrate, wherein the optical data connector is to mate with a corresponding optical data connector of the rack and is electrically coupled to the network interface controller.

Example 16 includes the subject matter of any of Examples 1-15, and further including (i) a first expansion connector secured to the top side of the chassis-less circuit board substrate and (ii) an expansion chassis-less circuit board substrate having a second expansion connector mated with the first expansion connector, wherein the expansion chassis-less circuit board substrate includes one or more physical resources usable by the sled controllers of the chassis-less circuit board substrate.

Example 17 includes the subject matter of any of Examples 1-16, and wherein the one or more physical resources of the expansion chassis-less circuit board substrate comprises memory.

Example 18 includes the subject matter of any of Examples 1-17, and wherein the one or more physical resources of the expansion chassis-less circuit board substrate comprises an accelerator circuit.

Example 19 includes the subject matter of any of Examples 1-18, and wherein the accelerator circuit comprises one of a field programmable gate array, an application-specific integrated circuit, a security co-processor, a graphics processing unit, a machine learning circuit, or a specialized processor.

Example 20 includes the subject matter of any of Examples 1-19, and wherein chassis-less circuit board substrate further comprises one or more mounting features to mate with a mounting arm of a robot to allow the robotic mounting of the sled into the rack.

Example 21 includes the subject matter of any of Examples 1-20, and wherein the one or more physical resources comprises two or more processors, and each processor operates at a power rating of at least 250 watts.

Example 22 includes the subject matter of any of Examples 1-21, and wherein each processor operates at a power rating of at least 350 watts.

Example 23 includes the subject matter of any of Examples 1-22, and further including a heatsink coupled to each processor, wherein each heatsink has a width and the sum of the widths of the heatsinks is greater than one-half of a width of the chassis-less circuit board substrate.

Example 24 includes the subject matter of any of Examples 1-23, and further including a heatsink coupled to each processor, wherein each heatsink has a width that is greater than one-quarter of a width of the chassis-less circuit board substrate.

Example 25 includes the subject matter of any of Examples 1-24, and wherein further including a fan-less heatsink coupled to each processor.

Example 26 includes the subject matter of any of Examples 1-25, and wherein the one or more memory devices comprises a dual in-line memory module that has a longitudinal axis that is parallel to a side edge of the chassis-less circuit board substrate.

Example 27 includes the subject matter of any of Examples 1-26, and further including a processor-to-processor interconnect, wherein each processor is communicatively coupled to the processor-to-processor interconnect to communicate with each other processor.

Example 28 includes the subject matter of any of Examples 1-27, and wherein each sled controller is an accelerator circuit.

Example 29 includes the subject matter of any of Examples 1-28, and wherein each accelerator circuit comprises one of a field programmable gate array, an application-specific integrated circuit, a security co-processor, a graphics processing unit, a machine learning circuit, or a specialized processor.

Example 30 includes the subject matter of any of Examples 1-29, and wherein the one or more physical resources comprises four or more accelerator circuits.

Example 31 includes the subject matter of any of Examples 1-30, and further including a storage cage secured to the chassis-less circuit board substrate and a plurality of solid state drives, wherein the storage cage includes a plurality of mounting slots and each solid state drive is secured in a corresponding mounting slot of the storage cage.

Example 32 includes the subject matter of any of Examples 1-31, and wherein each mounting slot comprises a plurality of drive guides that cooperate to define an access opening of the corresponding slot and wherein each access opening faces away from the chassis-less circuit board substrate.

Example 33 includes the subject matter of any of Examples 1-32, and wherein each solid state drive is secured in the corresponding mounting slot in a vertical orientation.

Example 34 includes the subject matter of any of Examples 1-33, and wherein storage cage comprises sixteen mounting slots.

Example 35 includes the subject matter of any of Examples 1-34, and wherein each sled controller comprises a storage controller to control the storage and retrieval of data from the plurality of solid state drives.

Example 36 includes the subject matter of any of Examples 1-35, and wherein each storage controller comprises a processor that is to operate at a power rating of about 75 watts.

Example 37 includes the subject matter of any of Examples 1-36, and further including a controller-to-controller interconnect, wherein each storage controller is communicatively coupled to the controller-to-controller interconnect to communicate with each other storage controller.

Example 38 includes a compute sled for operation in a rack of a data center, the compute sled comprising a chassis-less circuit board substrate having a top side and a bottom side opposite the top side; a plurality of processors coupled to the top side of the chassis-less circuit board substrate; and a plurality of memory devices coupled to the bottom side of the chassis-less circuit board substrate, wherein each of the plurality of memory devices is electrically coupled to at least one of the plurality of processors.

Example 39 includes the subject matter of Example 38, and wherein each processor operates at a rating of at least 350 watts.

Example 40 includes the subject matter of any of Examples 38 and 39, and further including a heatsink coupled to each processor, wherein each heatsink has a width and the sum of the widths of the heatsinks is greater than one-half of a width of the chassis-less circuit board substrate.

Example 41 includes the subject matter of any of Examples 38-40, and further including a heatsink coupled to each processor, wherein each heatsink has a width that is greater than one-quarter of a width of the chassis-less circuit board substrate.

Example 42 includes the subject matter of any of Examples 38-41, and wherein further including a fan-less heatsink coupled to each processor.

Example 43 includes the subject matter of any of Examples 38-42, and wherein the plurality of memory devices includes a dual in-line memory module that has a longitudinal axis that is parallel to a side edge of the chassis-less circuit board substrate.

Example 44 includes the subject matter of any of Examples 38-43, and further including a processor-to-processor interconnect, wherein each processor is communicatively coupled to the processor-to-processor interconnect to communicate with each other processor.

Example 45 includes the subject matter of any of Examples 38-44, and further including a plurality of electrical components, including the plurality of processors and the plurality of memory devices, coupled to the chassis-less circuit board substrate, wherein no two electrical components of the plurality of electrical components that produce non-nominal heat during operation shadow each other along a direction that extends from a front edge of the chassis-less circuit board substrate to a back edge of the chassis-less circuit board substrate.

Example 46 includes the subject matter of any of Examples 38-45, and further including (i) a first expansion connector secured to the top side of the chassis-less circuit board substrate and (ii) an expansion chassis-less circuit board substrate having a second expansion connector mated with the first expansion connector, wherein the expansion chassis-less circuit board substrate includes one or more physical resources usable by the sled controllers of the chassis-less circuit board substrate.

Example 47 includes the subject matter of any of Examples 38-46, and wherein the one or more physical resources of the expansion chassis-less circuit board substrate comprises memory or an accelerator circuit.

Example 48 includes an accelerator sled for operation in a rack of a data center, the accelerator sled comprising a chassis-less circuit board substrate having a top side and a bottom side opposite the top side; a plurality of accelerator circuits coupled to the top side of the chassis-less circuit board substrate; and a plurality of memory devices coupled to the bottom side of the chassis-less circuit board substrate, wherein each of the plurality of memory devices is electrically coupled to at least one of the plurality of accelerator circuits.

Example 49 includes the subject matter of Example 48, and wherein each accelerator circuit comprises one of a field programmable gate array, an application-specific integrated circuit, a security co-processor, a graphics processing unit, a machine learning circuit, or a specialized processor.

Example 50 includes the subject matter of any of Examples 48 and 49, and wherein the plurality of physical resources comprises four or more accelerator circuits.

Example 51 includes the subject matter of any of Examples 48-50, and wherein further including a fan-less heatsink coupled to each accelerator circuit.

Example 52 includes the subject matter of any of Examples 48-51, and further including a plurality of electrical components, including the plurality of accelerator circuits and the plurality of memory devices, coupled to the chassis-less circuit board substrate, wherein no two electrical components of the plurality of electrical components that produce non-nominal heat during operation shadow each other along a direction that extends from a front edge of the chassis-less circuit board substrate to a back edge of the chassis-less circuit board substrate.

Example 53 includes a storage sled for operation in a rack of a data center, the storage sled comprising a chassis-less circuit board substrate having a top side and a bottom side opposite the top side; a storage cage secured to the chassis-less circuit board substrate and a plurality of solid state drives, wherein the storage cage includes a plurality of mounting slots and each solid state drive is secured in a corresponding mounting slot of the storage cage; one or more storage controllers coupled to the top side of the chassis-less circuit board substrate, wherein the one or more storage controllers control the storage and retrieval of data from the plurality of solid state drives; and one or more memory devices coupled to the bottom side of the chassis-less circuit board substrate, wherein each of the one or more memory devices is electrically coupled to at least one of the one or more storage controllers to store data for the corresponding storage controller during operation of the storage sled.

Example 54 includes the subject matter of Example 53, and wherein each mounting slot comprises a plurality of drive guides that cooperate to define an access opening of the corresponding slot and wherein each access opening faces away from the chassis-less circuit board substrate.

Example 55 includes the subject matter of any of Examples 53 and 54, and wherein each solid state drive is secured in the corresponding mounting slot in a vertical orientation.

Example 56 includes the subject matter of any of Examples 53-55, and wherein storage cage comprises sixteen mounting slots.

Example 57 includes the subject matter of any of Examples 53-56, and wherein each storage controller comprises a processor that is to operate at a power rating of about 70 watts.

Example 58 includes the subject matter of any of Examples 53-57, and further including a controller-to-controller interconnect, wherein each storage controller is communicatively coupled to the controller-to-controller interconnect to communicate with each other storage controller.

Example 59 includes the subject matter of any of Examples 53-58, and further including a plurality of electrical components, including the one or more storage controllers and the one or more memory devices, coupled to the chassis-less circuit board substrate, wherein no two electrical components of the plurality of electrical components that produce non-nominal heat during operation shadow each other along a direction that extends from a front edge of the chassis-less circuit board substrate to a back edge of the chassis-less circuit board substrate.

The invention claimed is:

1. A sled for operation in a rack of a data center, the sled comprising:
a chassis-less circuit board substrate having a top side and a bottom side opposite the top side; and
a plurality of electrical components coupled to the chassis-less circuit board substrate, wherein no two electrical components of the plurality of electrical components that produce non-nominal heat during operation shadow each other along a direction that extends from a front edge of the chassis-less circuit board substrate to a back edge of the chassis-less circuit board substrate,
wherein the plurality of electrical components includes (i) one or more physical resources coupled to the top side of the chassis-less circuit board substrate and (ii) one or more memory devices coupled to the bottom side of the chassis-less circuit board substrate, wherein each of the one or more memory devices is electrically coupled to at least one of the one or more physical resources.

2. The sled of claim 1, wherein the chassis-less circuit board substrate is exposed to the local environment.

3. The sled of claim 1, further comprising a plurality of electrical components, including the one or more physical resources and the one or more memory devices, coupled to the chassis-less circuit board substrate, wherein no electrical component of the sled is cooled by an active cooling system of the sled during operation of the sled.

4. The sled of claim 3, further comprising a power connector to mate with a corresponding power connector of the rack to provide power to the electrical components of the sled.

5. The sled of claim 1, further comprising a plurality of electrical components, including the one or more physical resources and the one or more memory devices, coupled to the chassis-less circuit board substrate, wherein no electrical component of the sled receives power from a power supply of the sled during operation of the sled.

6. The sled of claim 1, wherein the chassis-less circuit board substrate has a rectangular shape having a width and a depth, and the width of the chassis-less circuit board substrate is greater than the depth of the chassis-less circuit board.

7. The sled of claim 6, wherein the width is about twenty-one inches and the depth is about nine inches.

8. The sled of claim 1, further comprising a network interface controller coupled to the top side of the chassis-less circuit board substrate.

9. The sled of claim 8, further comprising an optical data connector secured to the top side of the chassis-less circuit board substrate, wherein the optical data connector is to mate with a corresponding optical data connector of the rack and is electrically coupled to the network interface controller.

10. The sled of claim 1, further comprising (i) a first expansion connector secured to the top side of the chassis-less circuit board substrate and (ii) an expansion chassis-less circuit board substrate having a second expansion connector mated with the first expansion connector, wherein the expansion chassis-less circuit board substrate includes one or more physical resources usable by the sled controllers of the chassis-less circuit board substrate.

11. The sled of claim 1, wherein chassis-less circuit board substrate further comprises one or more mounting features to mate with a mounting arm of a robot to allow the robotic mounting of the sled into the rack.

12. The sled of claim 1, wherein the one or more memory devices comprises a dual in-line memory module that has a longitudinal axis that is parallel to a side edge of the chassis-less circuit board substrate.

13. The sled of claim 1, further comprising a controller-to-controller interconnect, wherein each physical resource is communicatively coupled to the controller-to-controller interconnect to communicate with each other physical resource.

14. A compute sled for operation in a rack of a data center, the compute sled comprising:
 a chassis-less circuit board substrate having a top side and a bottom side opposite the top side; and
 a plurality of electrical components coupled to the chassis-less circuit board substrate, wherein no two electrical components of the plurality of electrical components that produce non-nominal heat during operation shadow each other along a direction that extends from a front edge of the chassis-less circuit board substrate to a back edge of the chassis-less circuit board substrate,
 wherein the plurality of electrical components includes (i) a plurality of processors coupled to the top side of the chassis-less circuit board substrate and (ii) a plurality of memory devices coupled to the bottom side of the chassis-less circuit board substrate, wherein each of the plurality of memory devices is electrically coupled to at least one of the plurality of processors.

15. The compute sled of claim 14, further comprising a heatsink coupled to each processor, wherein each heatsink has a width and the sum of the widths of the heatsinks is greater than one-half of a width of the chassis-less circuit board substrate.

16. The compute sled of claim 14, wherein further comprising a fan-less heatsink coupled to each processor.

17. The compute sled of claim 14, wherein the plurality of memory devices includes a dual in-line memory module that has a longitudinal axis that is parallel to a side edge of the chassis-less circuit board substrate.

18. The compute sled of claim 14, wherein each of the plurality of processors operate at a power rating of at least 250 watts.

19. An accelerator sled for operation in a rack of a data center, the accelerator sled comprising
 a chassis-less circuit board substrate having a top side and a bottom side opposite the top side; and
 a plurality of electrical components coupled to the chassis-less circuit board substrate, wherein no two electrical components of the plurality of electrical components that produce non-nominal heat during operation shadow each other along a direction that extends from a front edge of the chassis-less circuit board substrate to a back edge of the chassis-less circuit board substrate,
 wherein the plurality of electrical components includes (i) a plurality of accelerator circuits coupled to the top side of the chassis-less circuit board substrate and (ii) a plurality of memory devices coupled to the bottom side of the chassis-less circuit board substrate, wherein each of the plurality of memory devices is electrically coupled to at least one of the plurality of accelerator circuits.

20. The accelerator sled of claim 19, wherein further comprising a fan-less heatsink coupled to each accelerator circuit.

21. The accelerator sled of claim 19, wherein each accelerator circuit comprises one of a field programmable gate array, an application-specific integrated circuit, a security co-processor, a graphics processing unit, a machine learning circuit, or a specialized processor.

22. The accelerator sled of claim 19, wherein the plurality of accelerator circuits comprises four or more accelerator circuits.

* * * * *